US010068098B2

(12) United States Patent
Embleton

(10) Patent No.: US 10,068,098 B2
(45) Date of Patent: Sep. 4, 2018

(54) DATA STORAGE AND ACCESS PLATFORM WITH JURISDICTIONAL CONTROL

(71) Applicant: Cicer One Technologies Inc., Kitchener (CA)

(72) Inventor: Robert A Embleton, Kitchener (CA)

(73) Assignee: CICER ONE TECHNOLOGIES INC., Kitchener (CA)

( * ) Notice: Subject to any disclaimer, the term of this patent is extended or adjusted under 35 U.S.C. 154(b) by 157 days.

(21) Appl. No.: 15/132,165

(22) Filed: Apr. 18, 2016

(65) Prior Publication Data

US 2016/0306989 A1 Oct. 20, 2016

Related U.S. Application Data

(60) Provisional application No. 62/148,971, filed on Apr. 17, 2015, provisional application No. 62/314,056, filed on Mar. 28, 2016.

(51) Int. Cl.
*H04L 29/06* (2006.01)
*G06F 21/60* (2013.01)
*G06F 21/62* (2013.01)

(52) U.S. Cl.
CPC ........ *G06F 21/602* (2013.01); *G06F 21/6245* (2013.01); *H04L 63/107* (2013.01); *G06F 2221/2111* (2013.01)

(58) Field of Classification Search
CPC .......... G06F 21/105; G06F 2221/2111; G06F 21/10; G06F 21/602; G06F 21/6245; G06F 21/31; H04L 63/107

USPC ....................................... 726/27–30; 713/182
See application file for complete search history.

(56) References Cited

U.S. PATENT DOCUMENTS

| | | | | |
|---|---|---|---|---|
| 7,797,546 B2* | 9/2010 | Kendon | ................ | G06F 19/322 713/182 |
| 8,028,339 B2* | 9/2011 | Han | ........................ | H04L 63/20 713/191 |
| 8,336,109 B2* | 12/2012 | Zhang | ..................... | G06F 21/10 713/161 |
| 8,607,070 B2* | 12/2013 | Chen | ................... | G06F 12/1466 713/182 |
| 8,793,777 B2* | 7/2014 | Colson | .................... | G06F 21/34 705/51 |
| 2005/0055560 A1 | 3/2005 | Kendon | | |
| 2005/0120137 A1 | 6/2005 | Moulton et al. | | |
| 2009/0187770 A1 | 7/2009 | Cao et al. | | |

(Continued)

*Primary Examiner* — Hosuk Song
(74) *Attorney, Agent, or Firm* — Tai W. Nahm; Miller Thomson LLP

(57) ABSTRACT

There is disclosed a modular data storage and access platform with jurisdictional control. The platform ensures alignment of jurisdictional compliance between a user, national laws, and associated data through pre-scripted data channeling and handling during execution of application provider business services and/or sharing and synchronizing data between approved parties, encapsulated though user defined encryption technology, while ensuring physical and legal ownership and defined residency of user data with solution enablement free of technical complexity or need of special education/training or need of information technology services. In an embodiment, the platform enables approved third party value added SaaS applications to manipulate data stored on the modular data storage without removing the data from the platform.

7 Claims, 25 Drawing Sheets

(56) References Cited

U.S. PATENT DOCUMENTS

| | | | |
|---|---|---|---|
| 2012/0303776 A1 | 11/2012 | Ferris | |
| 2013/0236015 A1* | 9/2013 | Li | H04K 1/00 |
| | | | 380/270 |
| 2013/0325728 A1* | 12/2013 | Bialostok | G06Q 50/18 |
| | | | 705/311 |

* cited by examiner

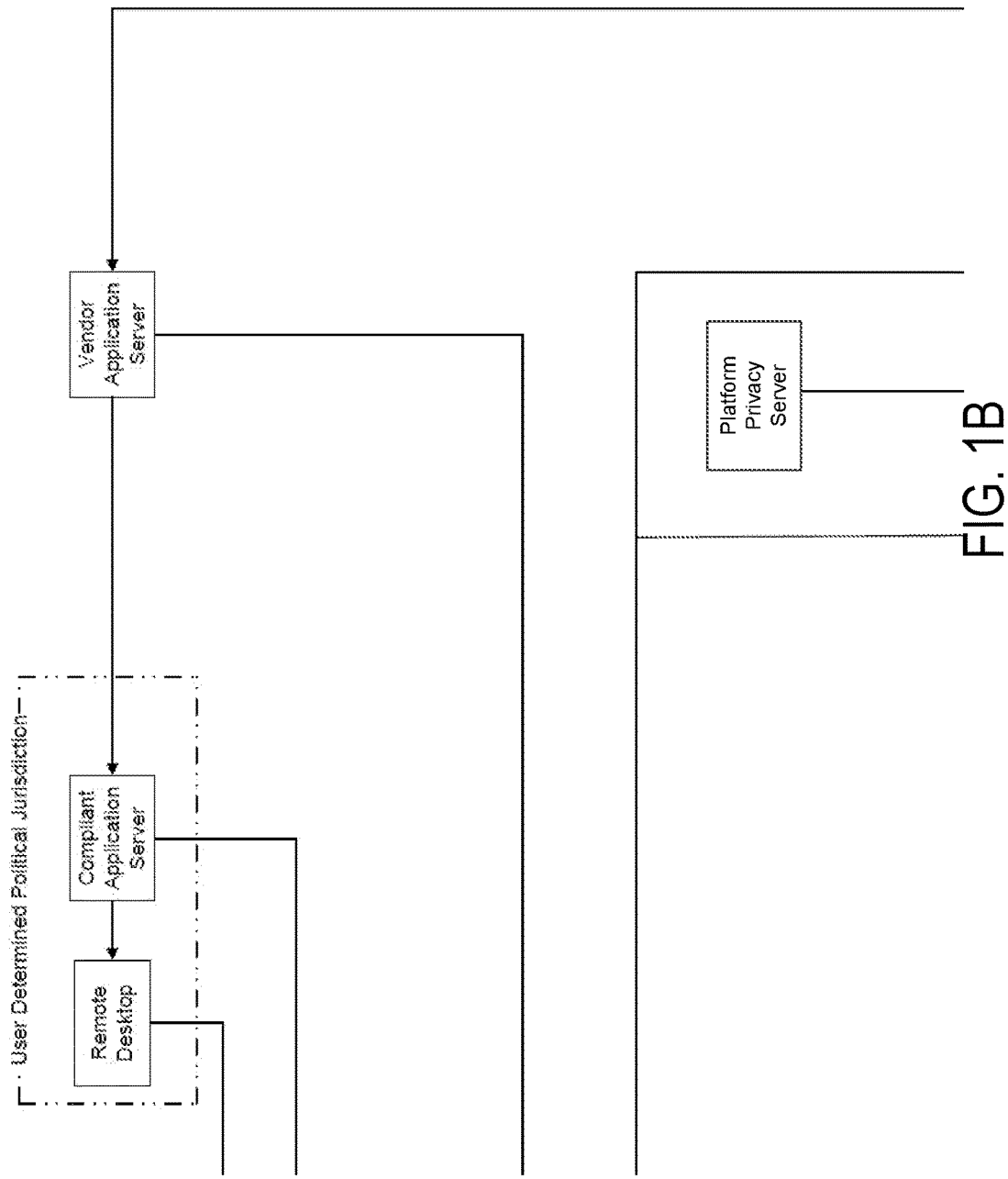

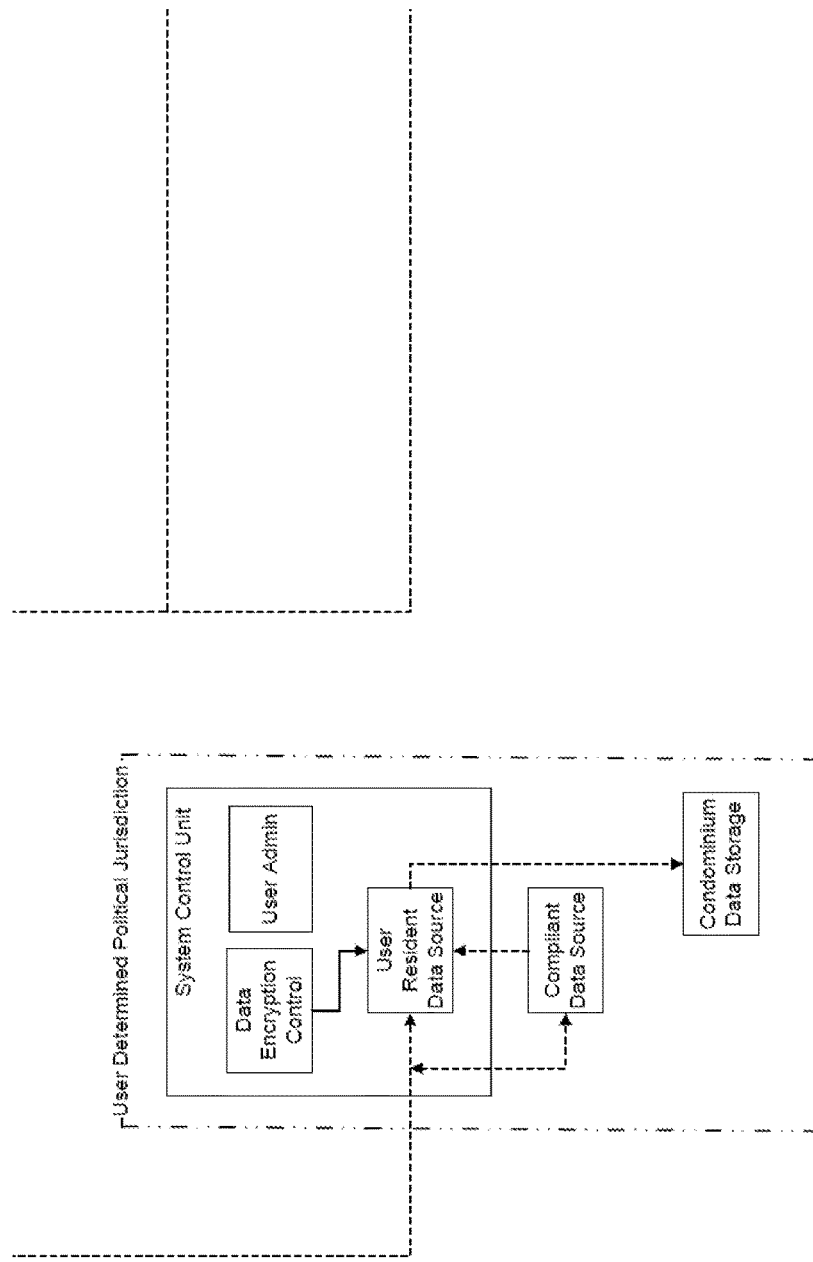

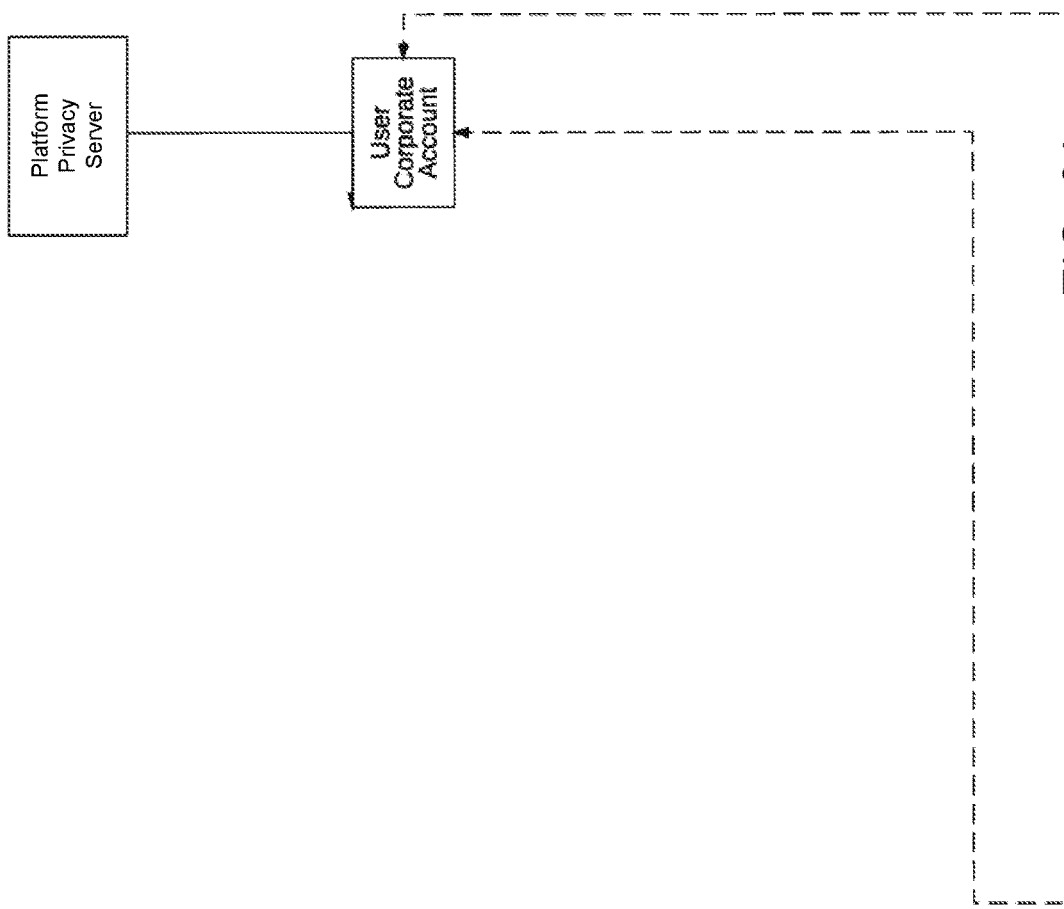

DATA STORAGE AND ACCESS PLATFORM WITH JURISDICTIONAL CONTROL

RELATED APPLICATIONS

The present application is a non-provisional application of U.S. Provisional Application No. 62/148,971, filed Apr. 17, 2015 and U.S. Provisional Application No. 62/314,056 filed on Mar. 28, 2016. The contents of these applications are incorporated herein by reference in their entirety for all purposes, and this application claims priority to these Provisional Applications.

FIELD

The present disclosure relates to a data storage and access platform with jurisdictional control.

BACKGROUND

Businesses and consumers presently engage in technological solutions that enable business operations, handle digital content, mange communications, and improve employee mobility. Businesses and consumers may embody these activities in two broad vertical methodologies: 1) implement individual Software as a Service (SaaS) applications from multiple vendors where activation of the service requires minimal technical domain knowledge, low infrastructure costs, and minimal support labor; and 2) internally develop the ability, through direct department definition or contracted services, to purchase, maintain, and provide access to applications, digital content storage, communications, and user data synchronization. To a broad extent, the majority of business and consumer users are motivated to implement, to some degree, both methodologies to manage the diverse activities encountered in business and consumer interactions of digital solutions. However, both solutions drive inherent risks for businesses and consumers.

The first vertical methodology creates a risk for the user and those parties described inside the user's digital data that may see this information outside of their control, loss of data ownership, exposure to ongoing behavior monitoring, undesired jurisdictional exposure, and third party profit generation through the sale of this digital data.

The second vertical methodology requires significant fixed and variable overhead costs for the user in the development of all required systems and purchase/maintenance of application software. Furthermore, the second vertical methodology requires the user to monitor national and international laws to ensure control and privacy compliance. The second vertical methodology also drives the user to recreate or reproduce solutions equivalent to existing third party services, and invariably forces the user to adopt the first vertical methodology solutions in addition as to reduce implementation time during growth phases.

What is needed is an improved technological solution that overcomes at least some of these limitations.

SUMMARY

The present disclosure relates to a modular data storage and access platform with jurisdictional control including a novel SaaS privacy compliance model.

In an aspect, the platform ensures alignment of jurisdictional compliance between a user, national laws, and associated data through pre-scripted data channeling and handling during execution of application provider business services and/or sharing and synchronizing data between approved parties, encapsulated though user defined encryption technology, while ensuring physical and legal ownership and defined residency of user data with solution enablement free of technical complexity or need of special education/training or need of information technology services. In other words, the platform ensures that user data is stored only within physical data storage that is jurisdictionally compliant, and access to which is directly and legally controlled by the user.

In an embodiment, a turn-key platform solution is provided which automatically enables data residency definition, ownership, privacy, automatic compliance to privacy laws within a chosen installation jurisdiction, platform embedded jurisdictionally compliant data ownership policy for SaaS vendor compliance, and ownership of encryption technology.

In another embodiment, the platform provides a user administrative interface which enables creation of a virtual organization structure, from which a corresponding directory structure may be automatically generated. This directory structure is created on a modular data storage device which is physically and/or legally within an organization's control. Based on the positions and departmental functions defined in the virtual organization structure, access rights to the directories are assigned to the positions and departmental functions, and automatically managed to enforce and maintain data privacy and data security. The directory structure and any storage remains jurisdictionally compliant at all times.

In another embodiment, any data stored within the directory structure on the modular data storage device or on any offsite data storage device is encrypted, such that only those users in positions with assigned access rights are able to access the data stored in the directory structures. Any unauthorized attempts to access, copy or move data are detected and logged, and may be automatically blocked to secure data privacy and data security.

In another embodiment, SaaS vendors must be pre-approved before being allowed to offer their services on the platform, and are legally bound to the user data privacy policy for the platform. To do so, SaaS vendors will implement prescribed Application Programmers Interface ("API") that controls the flow and security of user data across the platform. The system requires very limited domain knowledge and removes the need and expense of information technology services whether that is contracted or departmental to implement software applications for the user.

In another embodiment, the platform enables approved third party value added SaaS applications to manipulate data stored on the modular data storage or in a trusted jurisdictional compliant source, or through a trusted temporary processing instance, but not to copy user data in the platform to be stored elsewhere, without express permission and only through access of restricted API functions.

In another embodiment, the platform provides data backup integrity comparable to existing cloud backup solutions, but which allows a user to maintain physical ownership and control of the user's data, and maintain jurisdictional compliance of the storage devices. By way of example, the data backup may be maintained in a secure, offsite data center providing a secure access to a private physical drive in a user-secured and legally controlled condominium storage unit accessible only to the user.

Advantageously, the platform may provide a relatively low cost technological solution for ensuring data privacy, jurisdictional control, privacy law alignment for a user while enabling access to a variety of compliant SaaS vendors.

In this respect, before explaining at least one embodiment of the system and method of the present disclosure in detail, it is to be understood that the present system and method is not limited in its application to the details of construction and to the arrangements of the components set forth in the following description or illustrated in the drawings. The present system and method is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIGS. 1A to 1D show a schematic block diagram of a data control platform in accordance with an illustrative embodiment.

FIGS. 6A to 6C show a schematic block diagram of a process schematic for user system interaction in accordance with an illustrative embodiment.

DETAILED DESCRIPTION

Figure 1A:
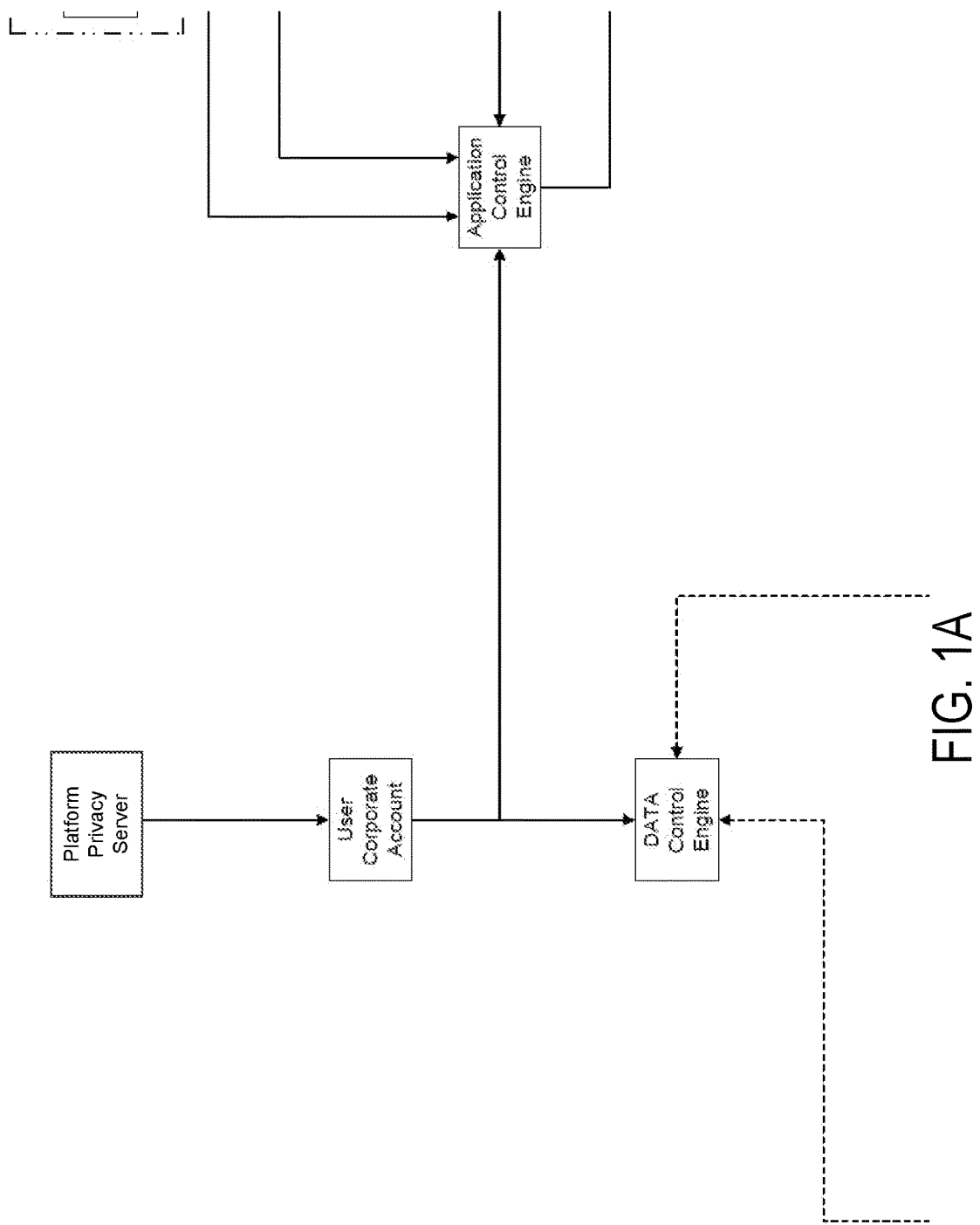
Figure 1D:
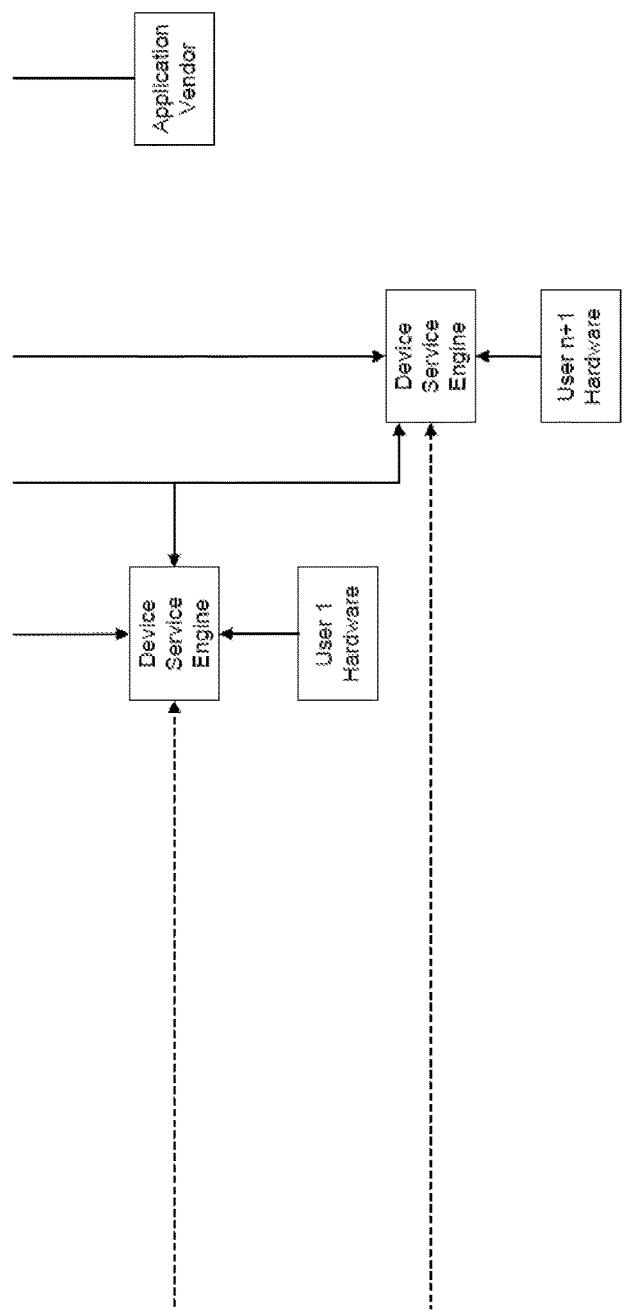
Figure 2A:
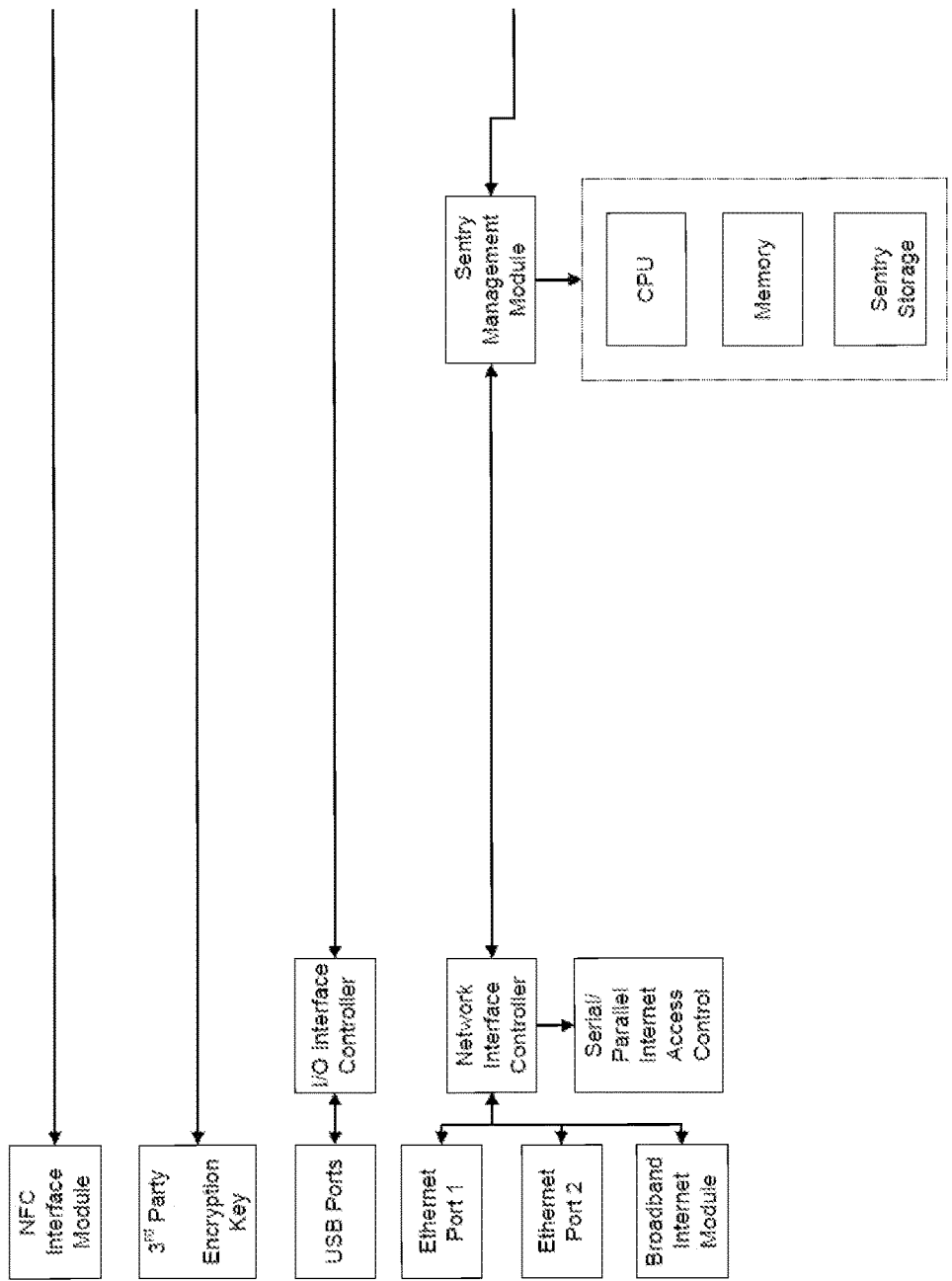
FIGS. 2A to 2D show a schematic block diagram of a system control unit in accordance with an illustrative embodiment.
Figure 2B:
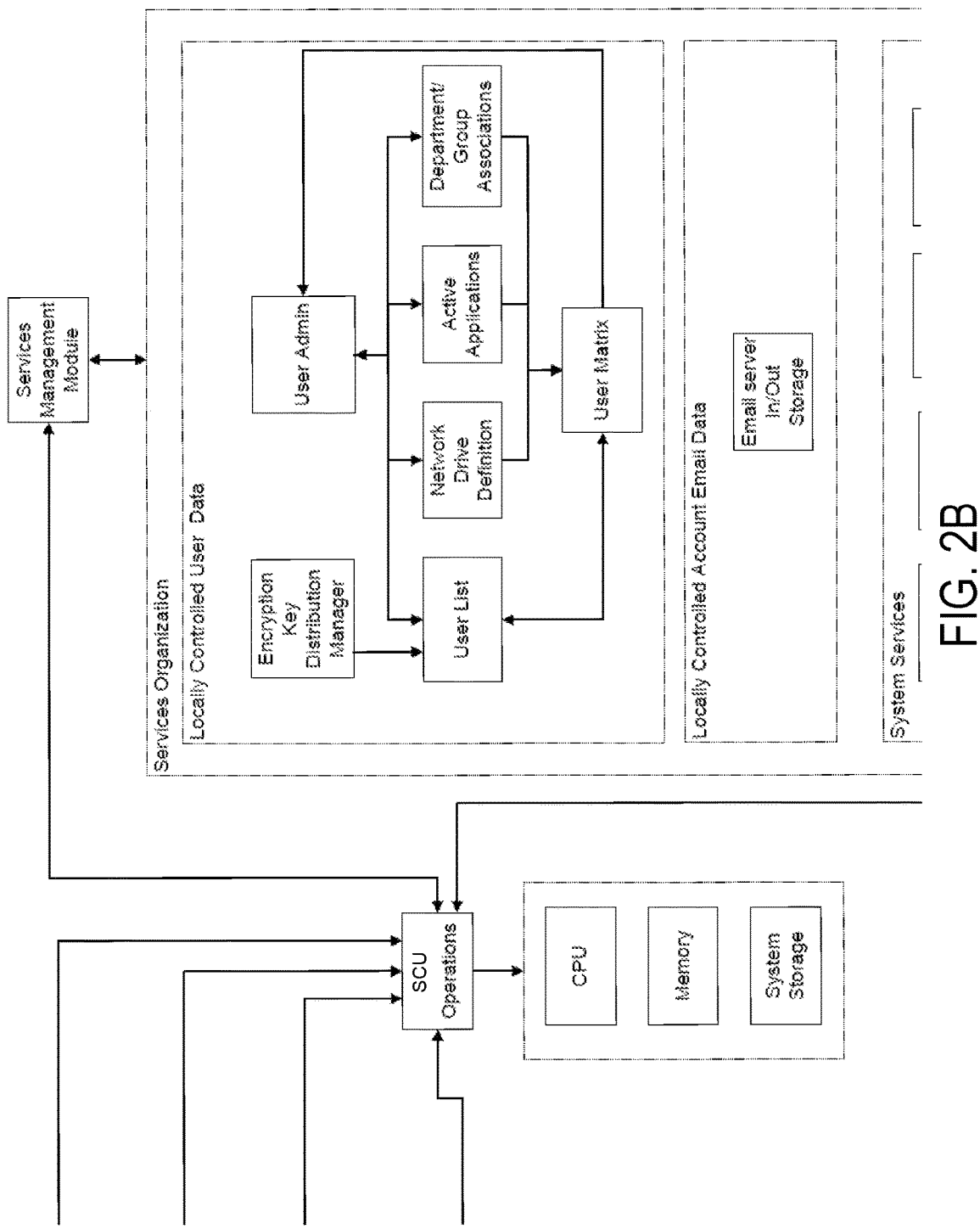
Figure 2C:
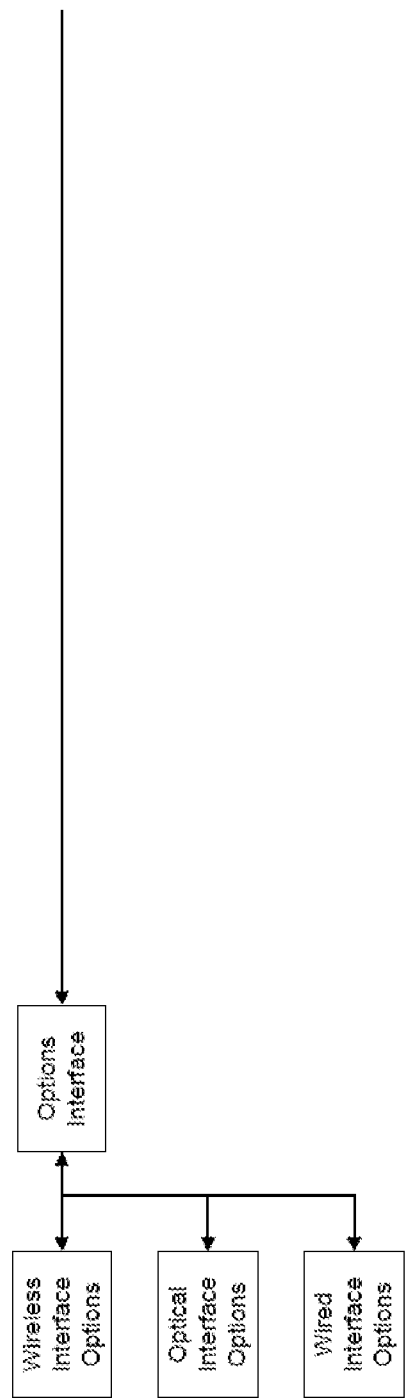
Figure 2D:
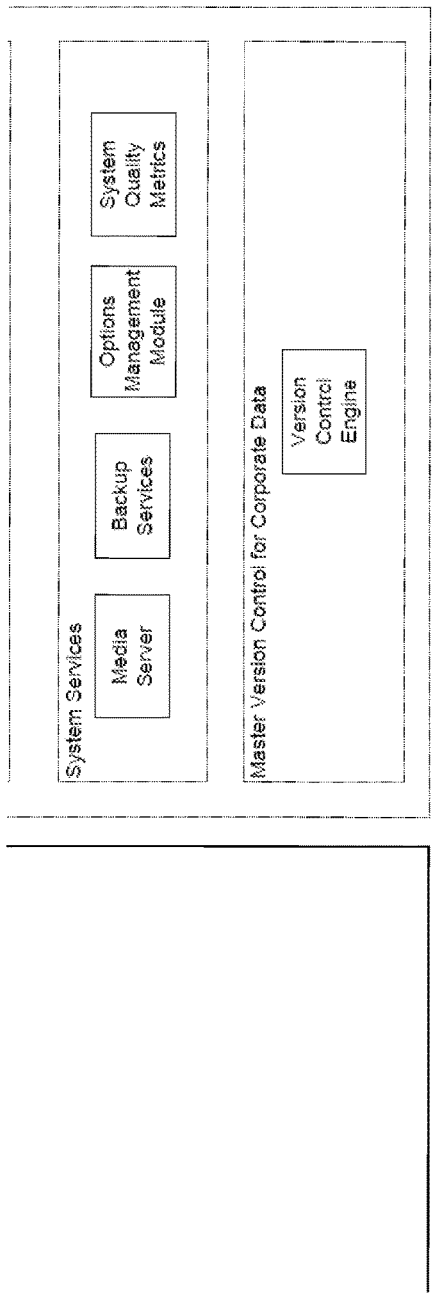

As noted above, the present disclosure relates to a modular data storage and access platform with jurisdictional control. Advantageously, the platform may provide a relatively low cost technological solution for ensuring data privacy and jurisdictional control in comparison to existing solutions.

An illustrative embodiment of the platform will now be described in more detail with reference to the figures.

Platform Architecture

Referring to FIGS. 1A to 1D, shown is a schematic block diagram of an illustrative architecture for a data control platform in accordance with an embodiment. As shown, a system control unit (SCU) is physically located within a user defined jurisdiction (e.g. a national or political home jurisdiction). The SCU includes data encryption control and a user resident data source. The user resident data is captured by the SCU at the user premises, and is stored locally within data storage located within the home jurisdiction.

An optional compliant data source service provides a jurisdictionally compliant SCU data mirror to provide redundancy and data protection, but the data mirror stays within the boundaries of the home jurisdiction to remain compliant with all jurisdictional laws.

In an embodiment, the platform enables approved third party value added SaaS applications to manipulate data stored on the modular data storage, but not to take sensitive data from the platform to be stored elsewhere, without express permission. Qualified SaaS providers are given access to data only after guaranteeing compliance with user ownership policies defined by the platform, including in transit data ownership integrity topography. The system requires very limited domain knowledge and removes the need and expense of information technology services whether that is contracted or departmental.

In another embodiment, a turn-key platform solution is provided which automatically enables data residency definition, ownership, automatic compliance to privacy laws within chosen install jurisdiction, platform embedded jurisdictionally compliant data ownership policy, and ownership of encryption technology.

In an embodiment, a user resident data source is electronically connected to a data control engine. This data control engine enables channel switching that manages data separation from the servicing application. The data control engine also controls channeling to ensure compliance with user local privacy laws. Furthermore, the data control engine manages optional channels to improve data access speed to maintain a positive user experience.

In an embodiment, the data control engine is electronically connected to one or more user devices. The one or more user devices may include a data control engine which manages local data services, such as network topography deployment, local revision control, data synchronization and device specific encryption. The data control engine also manages data pathways such that the application can interact with data on the local hardware, or virtually through a jurisdictionally compliant source. Furthermore the data control engine enables access to user admin functions that address both user customization and corporate administrative functions.

Users who use the devices may interact with any application data made available on the platform, or perform data manipulation (e.g. creation, editing, deleting) from any location. The platform automatically ensures compliance to local privacy laws of the SCU install jurisdiction, and maintains physical ownership of all data generated and/or manipulated. The manner in which users may access their data is explained in further detail below with reference to a privacy matrix which manages this access.

Offsite Data Storage & Backup

In another embodiment, the platform provides data backup integrity comparable to existing technological solutions, but which maintains data security and jurisdictional control.

By way of example, a remote active storage and data backup "condominium" storage unit may provide a 24/7 controlled access facility having shared ownership. This condominium storage unit may be partially owned by the user, and contain a compartment fully owned by the user that holds the user owned data media, and to which all user data received at the 24/7 access facility is directed. Only the user is normally provided with a key to access the compartment unit owned by the user. This ensures the ownership of the data by the user, and consequently the data stored in the media as well.

In order for a user to remotely access their physical drive in the condominium storage unit, an onsite server manages the access by creating a secure link between the user's computer and their physical storage device located at the condominium storage unit. Any data stored onsite at the condominium storage unit may also be encrypted in order to prevent unauthorized access if physical security is somehow breached.

In another embodiment, the physical device located at the condominium storage unit may also include a security mechanism designed to automatically erase any data stored in the device should physical security of the device be compromised.

Jurisdictional Privacy Compliance

In another aspect, the platform ensures alignment of jurisdictional compliance between a user, national laws, and associated data through pre-scripted data channeling and handling during execution of application provider business services and/or sharing and synchronizing data between approved parties, encapsulated though user defined encryption technology, while ensuring physical and legal ownership and defined residency of user data with solution enablement free of technical complexity or need of special education/training or need of information technology services.

As an illustrative example, referring back to the data control engine, in an embodiment, data control engine is connected to a platform privacy server, which is owned and managed by a service provider, and which enables control tools that manage the system. This may include maintaining and managing a privacy compliance matrix, an application compliance matrix, and a jurisdiction compliance matrix. These matrices normally involve detailed data sets that alter the data pathways for applications and thus remain compliant to privacy regulations.

In an embodiment, the jurisdictional compliance matrix contains the distilled control signals that map compliance requirements of user defined jurisdictional laws and any system user's real-time location jurisdictional laws. The application compliance matrix contains the distilled control signals that map a particular application's data manipulation requirements in regards to how it must interact with user data with regard to storage, processing, reporting, and also considering the sensitivity of the data types. The privacy matrix maps the two input matrices to produce summation signals that define how the requested application must resolve execution to remain compliant against the jurisdictional privacy laws. The user account on the SCU contains the distilled control signals that map the user permissions against approved application types and the individual users mapped relationship including permissions for network shared data and encryption keys. The device services engine manages the private and secure record of the user's current geographical/jurisdictional location and reports this back to the corporate account and subsequently to the privacy matrix. The privacy matrix presents an expression, in this example a boolean expression, which results in the switching logic required to enable a compliant pathway of service to the user via the data control engine and the application control engine.

In an embodiment, the data control engine and platform privacy server are each electronically connected to an application control engine. The application control engine connects to a remote desktop and a compliant application server, which both reside in a home jurisdiction. The compliant application server retains a mirror copy of the current vendor applications offered to the User. The vendor is responsible to upload and maintain these mirror copies in an active status. The compliant application server, sits inside the user jurisdiction and enables, as required, an application execution path that manages privacy law compliance and/or an optimized User experience.

In an embodiment, application control engine is electronically connected to a vendor application server, which communicates with the application control engine. The application control engine takes direction from the privacy matrix to determine the source channel used to deliver the requested application to the user. When the user calls the application the device services engine will assign the appropriate IP address that will enable the compliant application source that may be remote desktop, compliant application server, or vendor application server to respond. Communications between the vendor application server or the compliant application server or the remote desktop and the user device is via standard internet protocol. The vendor application server is owned and managed by the application vendor, and its location is controlled by the application vendor. To maintain data privacy and control at the home jurisdiction, user data is not captured nor stored by the application vendor. To ensure compliance, the application vendor must be approved by the privacy platform service provider for distribution of the application via the platform, and is legally bound to the user privacy policy. Any active software supplied by the application vendor communicates through a proprietary API to properly interact with the platform.

System Control Unit

Now referring to FIGS. 2A to 2D, shown is a schematic block diagram of a System Control Unit (SCU) in accordance with an illustrative embodiment. As shown, SCU comprises a number of blocks including an operation block, comprising a CPU, memory and system storage; a sentry management module, comprising a CPU, memory, and a black box storage; and a services management block, comprising a media server, an email server in/out storage, a corporate account block, and backup services.

The operation block manages the entire SCU functionally. For example, operations block manages data synchronization functions and polices all services activities. This block may utilize a proprietary system architecture, operating system, and internet communication protocol, such that the system is not vulnerable to viruses that may attack more common, widely distributed architectures and operating systems.

In an embodiment, the operation block electronically communicates with a near field communications (NFC) block, which may be implemented to allow rapid assignment of mobile devices to a user by an administrator. The user account is enabled and the administrator is able to rapidly setup or transfer accounts to new hardware. The NFC process also captures the device identifier to instantly process the required encryption key.

In another embodiment, the operation block electronically communicates with a plug-in encryption device, such as a $3^{rd}$ party encryption key in a USB format for example. The $3^{rd}$ party encryption key may be a standalone microprocessor enabled device that generates a high-grade security encryption keys for the system. The device is available through partnered and qualified $3^{rd}$ parties to enable the user to have ownership over the encryption technology. This helps to ensure that the service provider does not have unencrypted access to the user data, and any data backups are protected by the User directly.

In an embodiment, the encryption key is used during boot up of the data storage platform, and may be removed after boot up. This way, if the data storage platform is powered down or unplugged, any data stored on the device is encrypted and remains inaccessible without the key.

In another embodiment, the operation block electronically communicates with an I/O interface controller, which in turn controls one or more USB ports. The operation block also electronically communicates with a network interface controller.

The network interface controller may control a serial/parallel internet access control block, which enables dual internet service provider lines. Once enabled, the service manages dual internet access to improve data throughput. A local server may also manage multiple channels to improve throughput.

In an embodiment, the broadband internet block enables mobile cell phone network based internet access, and may be used as a backup in the event of a hardware failure. This alternate connection may also provide an improved user experience during an initial platform installation phase.

Referring back to the sentry management module in the drawings, in an embodiment, the black box management block monitors the local internet traffic looking for anomalous communication attempts to the network connection port. Anomalous communication is identified as being any communication that is not the proprietary communication protocol used by the platform.

In an embodiment, the black box may issues a temporary pause to the platform operation model intended to protect the model from undesired communications. The black box may also proceed to communicate with the anomalous traffic in an attempt to identify the source, the intent, or the entity behind the traffic. The black box will aggregate this information to the platform privacy server that may be used to further address and locate the traffic source. This information may be used to measure security breach attempts, and attempt to identify trends.

Referring now to the services management block, in an embodiment, the services management block electronically communicates with a version control engine. The version control engine is lined to a system encryption engine, and an encryption key distribution manager.

In an embodiment, the version control engine electronically communicates with a user storage base management block, which in turn communicates with an options management block. The options management block also electronically communicates with both the services management block, and the operation block.

In an embodiment, the options management block is connected to an options interface, which enables connection via various interface options, such as wireless interface options, optical interface options and wired interface options.

In summary, the SCU manages virtually all options to ensure that limited user intervention is required in order to operate the platform. All optional systems and blocks are enabled through a stackable function. That is, the option is simply placed under the SCU, and the remaining setup or personalization is done through a user administration interface. This "stack & go" technology may utilize both proprietary and off-the-shelf wireless communications, optical communications, and wired communications to achieve connectivity to the SCU.

Remote Data Access

Figure 3:
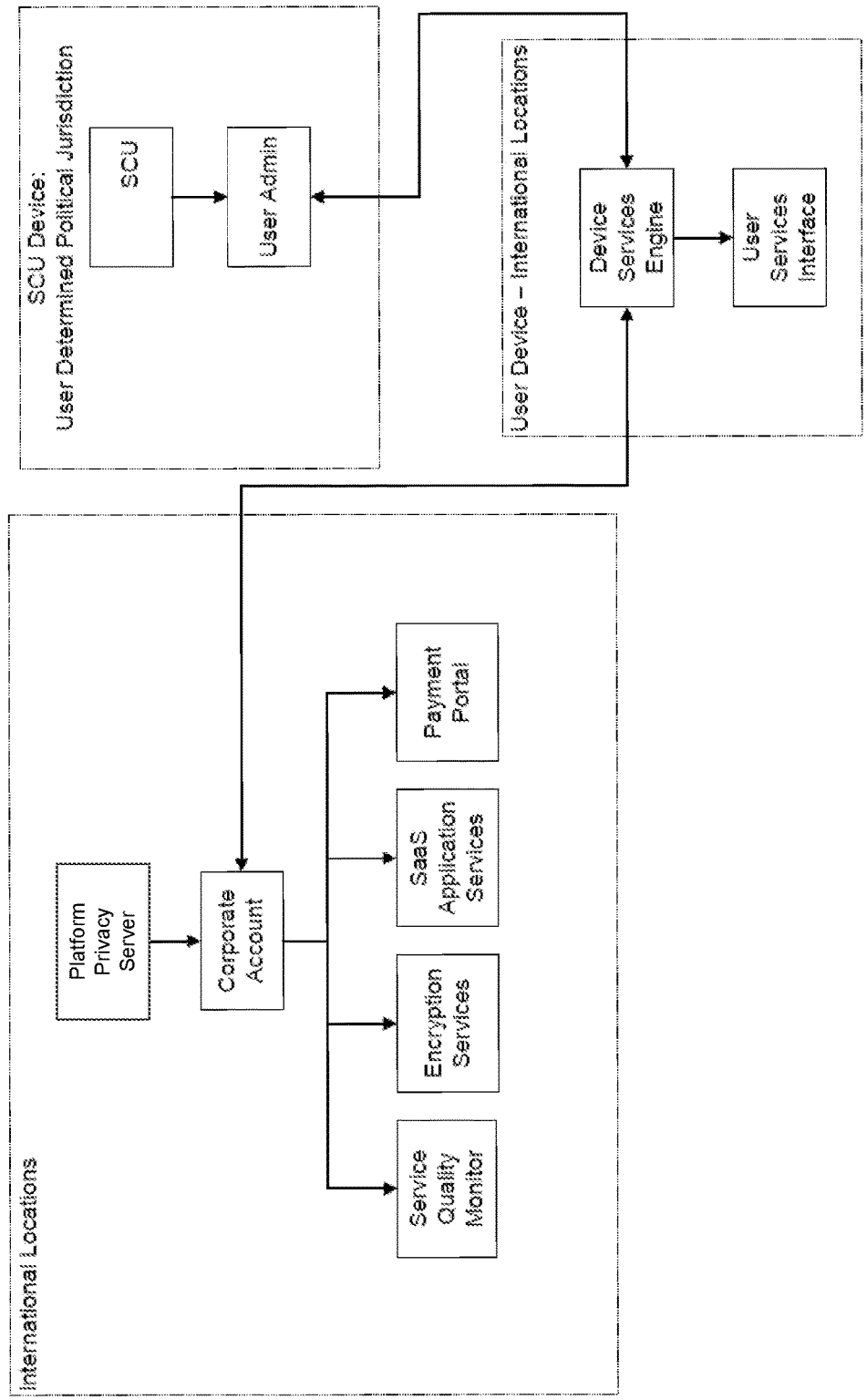
FIG. 3 shows a schematic block diagram of a user administrative control model in accordance with an illustrative embodiment.
Figure 4A:
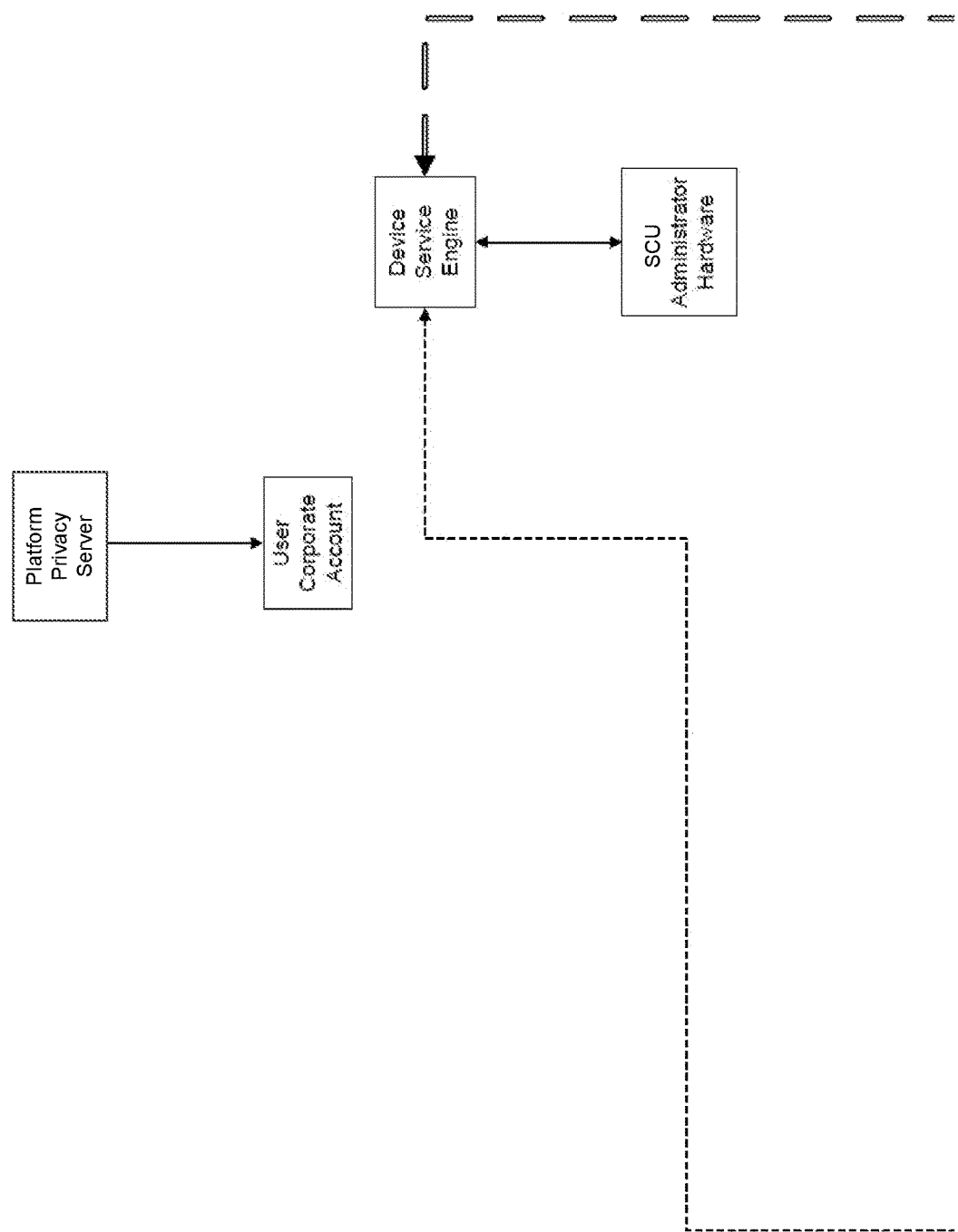
FIGS. 4A to 4D show a schematic block diagram of an admin-system interaction in accordance with an illustrative embodiment.
Figure 4B:
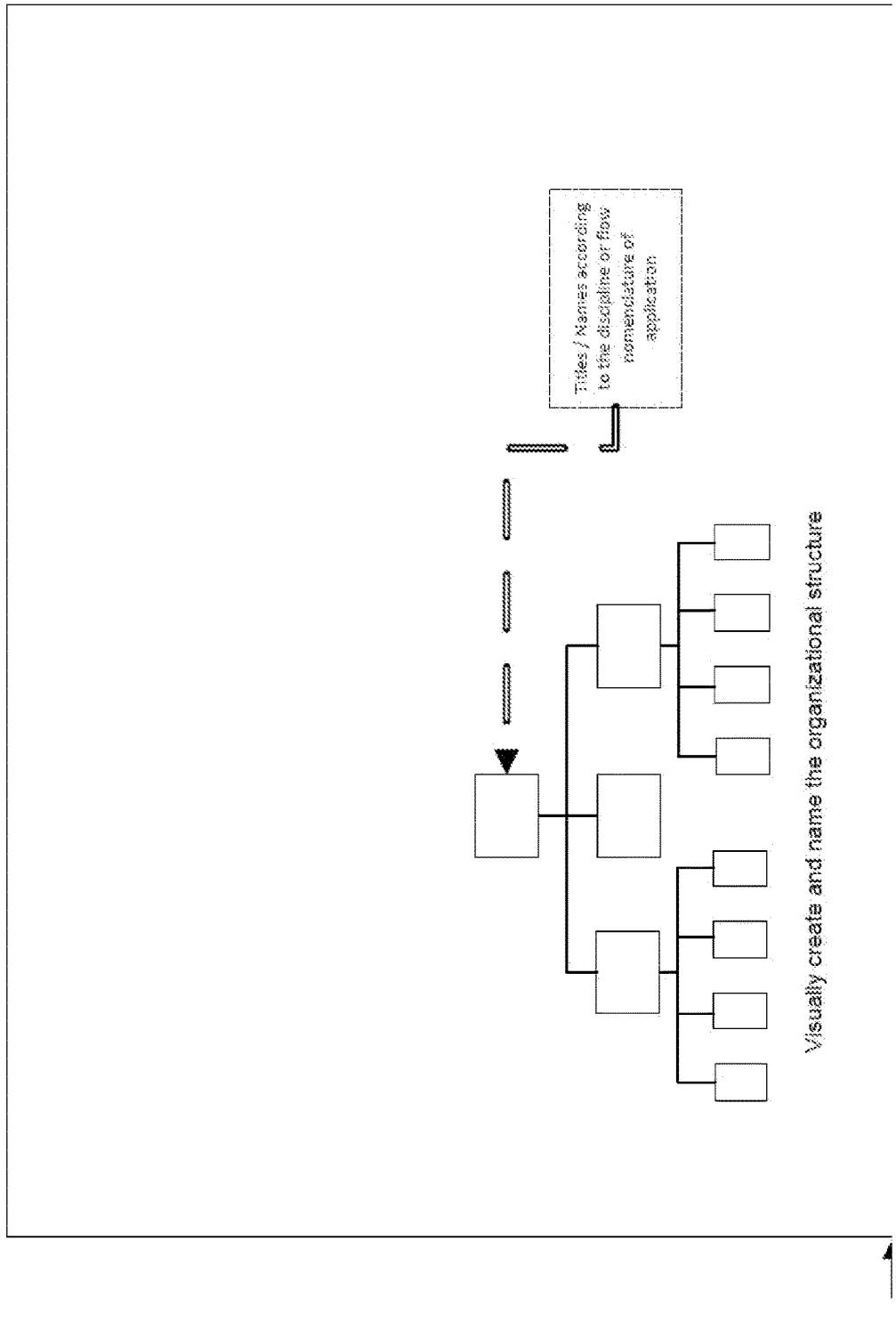
Figure 4C:
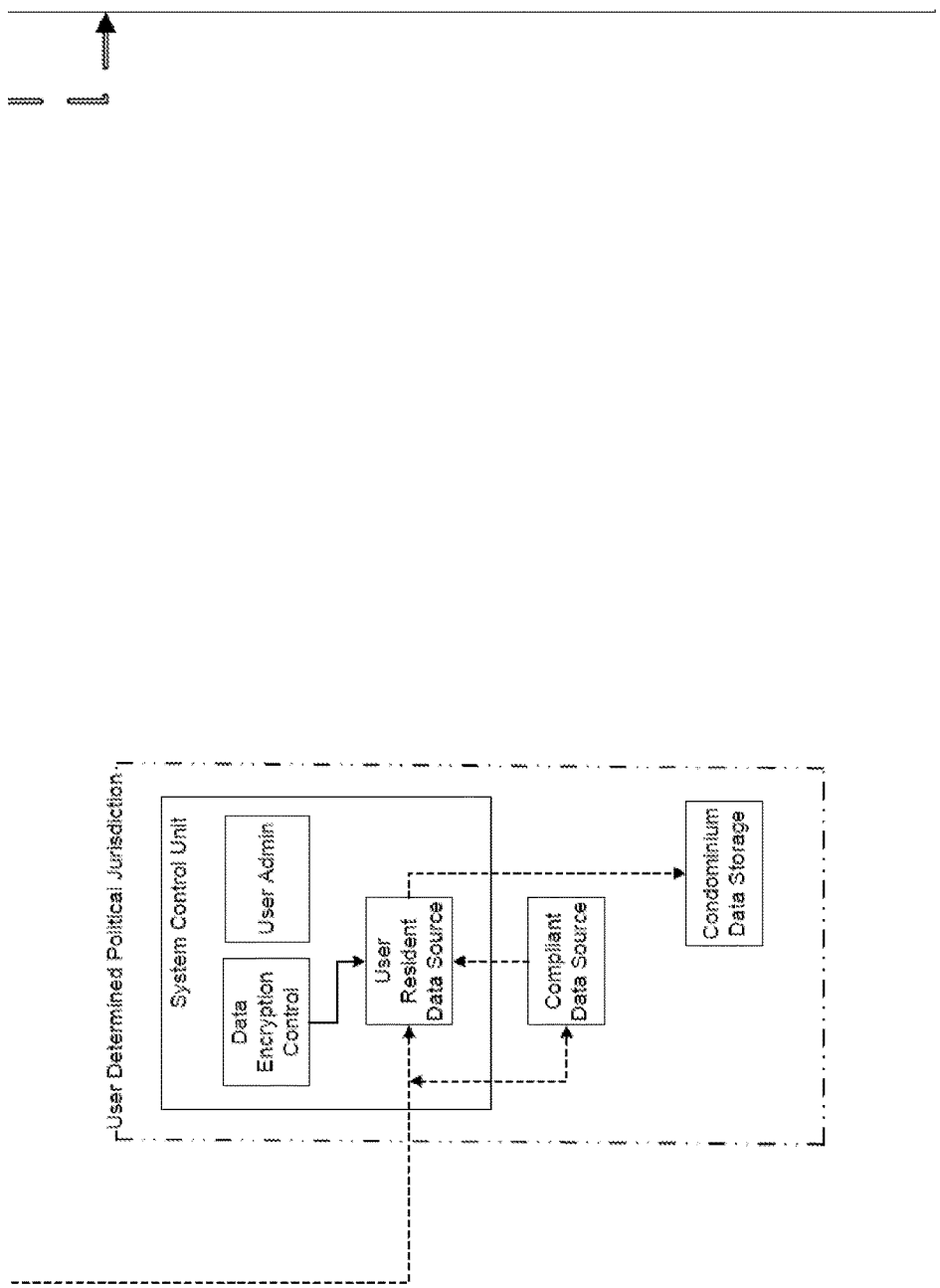
Figure 4D:
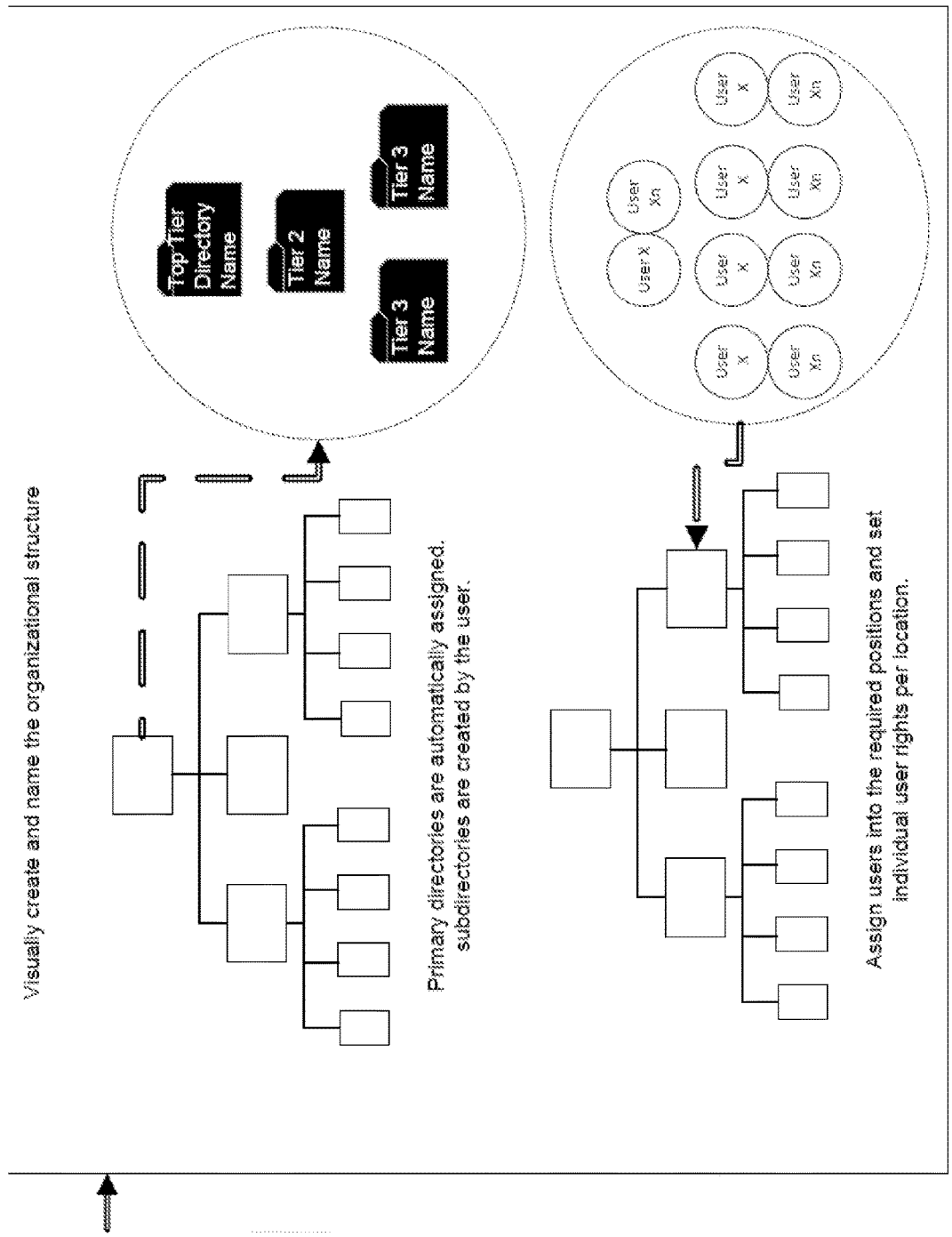
Figure 5A:
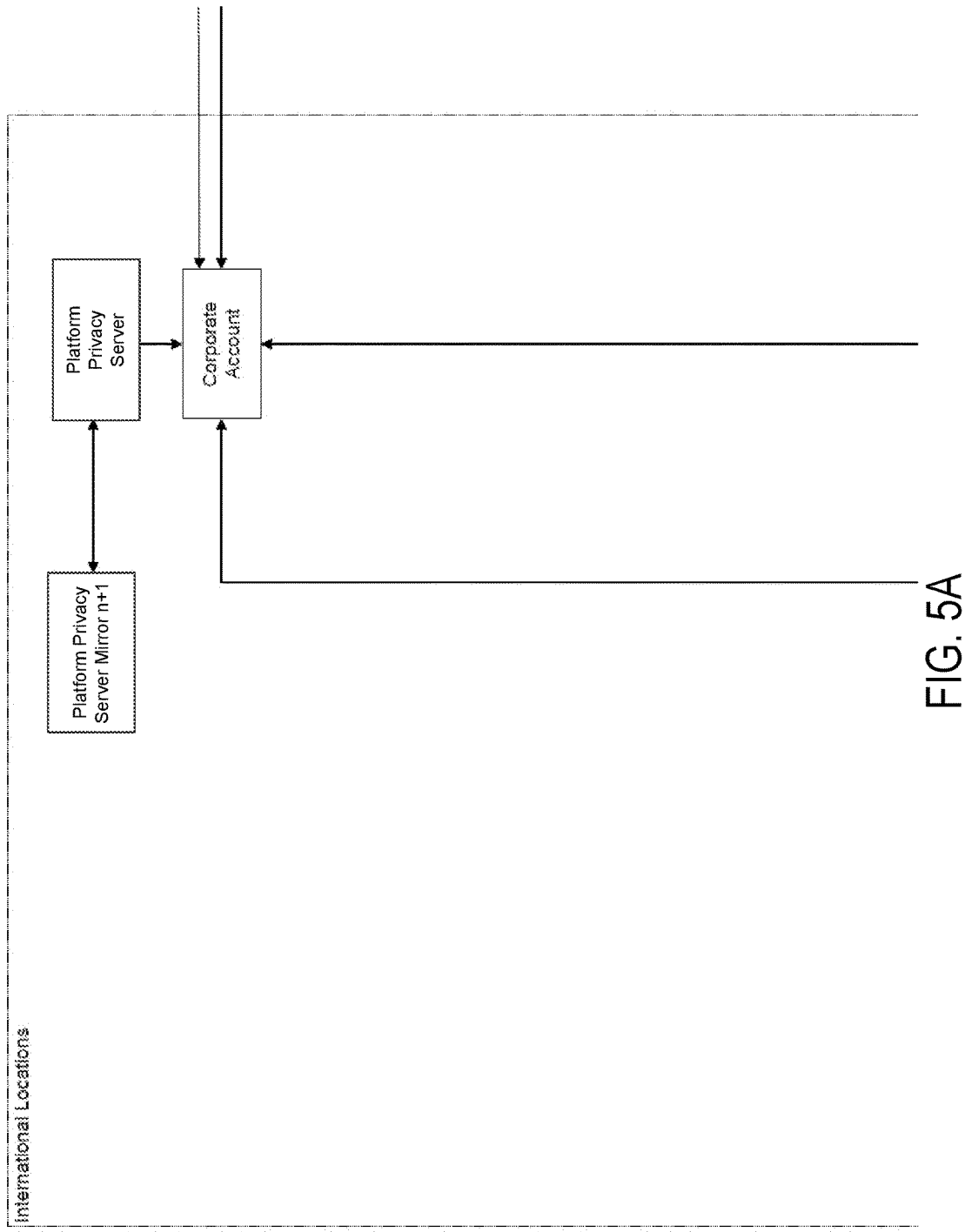
FIGS. 5A to 5D show schematic diagrams of a platform privacy server and management of remote user connections in accordance with an illustrative embodiment.
Figure 5B:
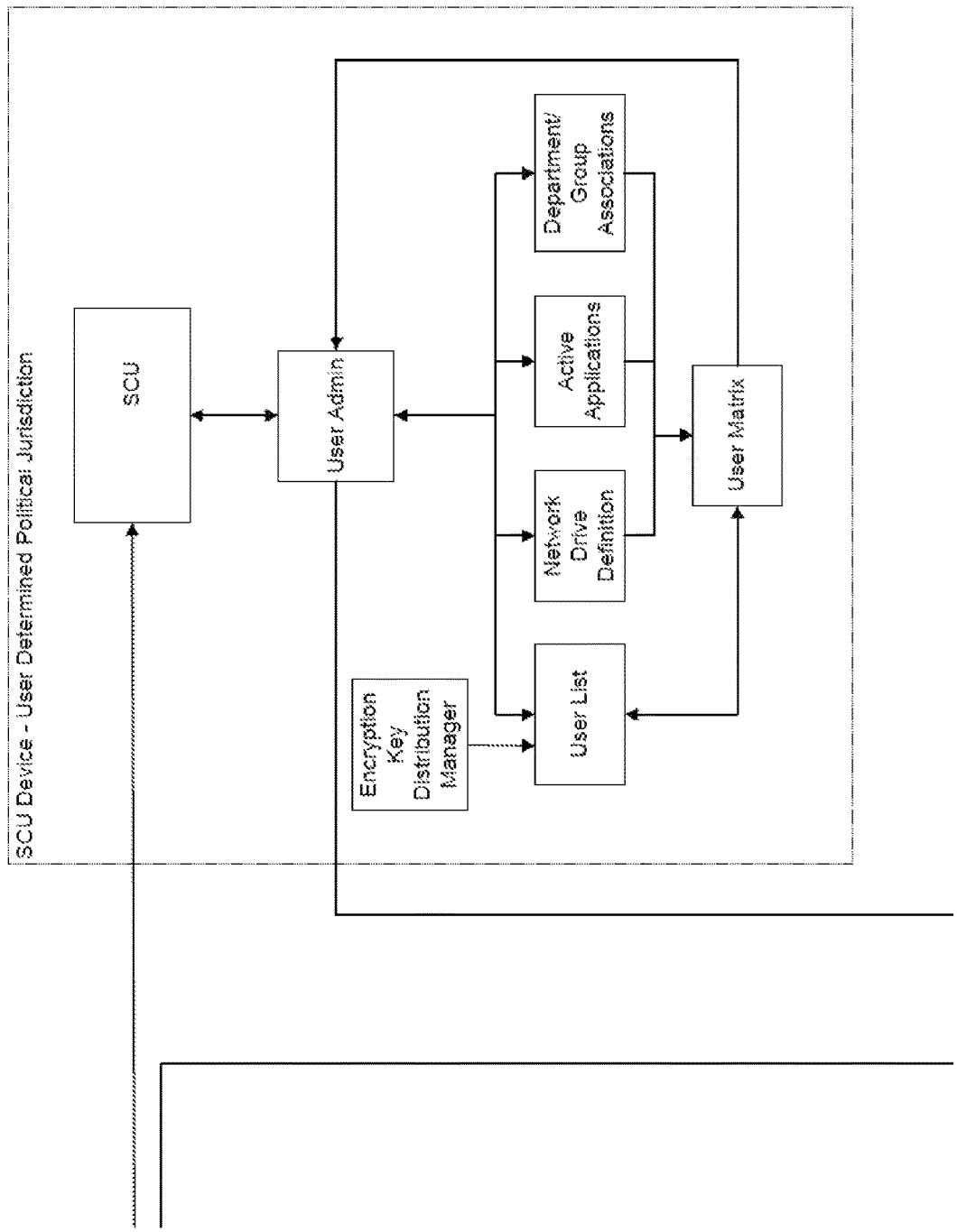
Figure 5C:
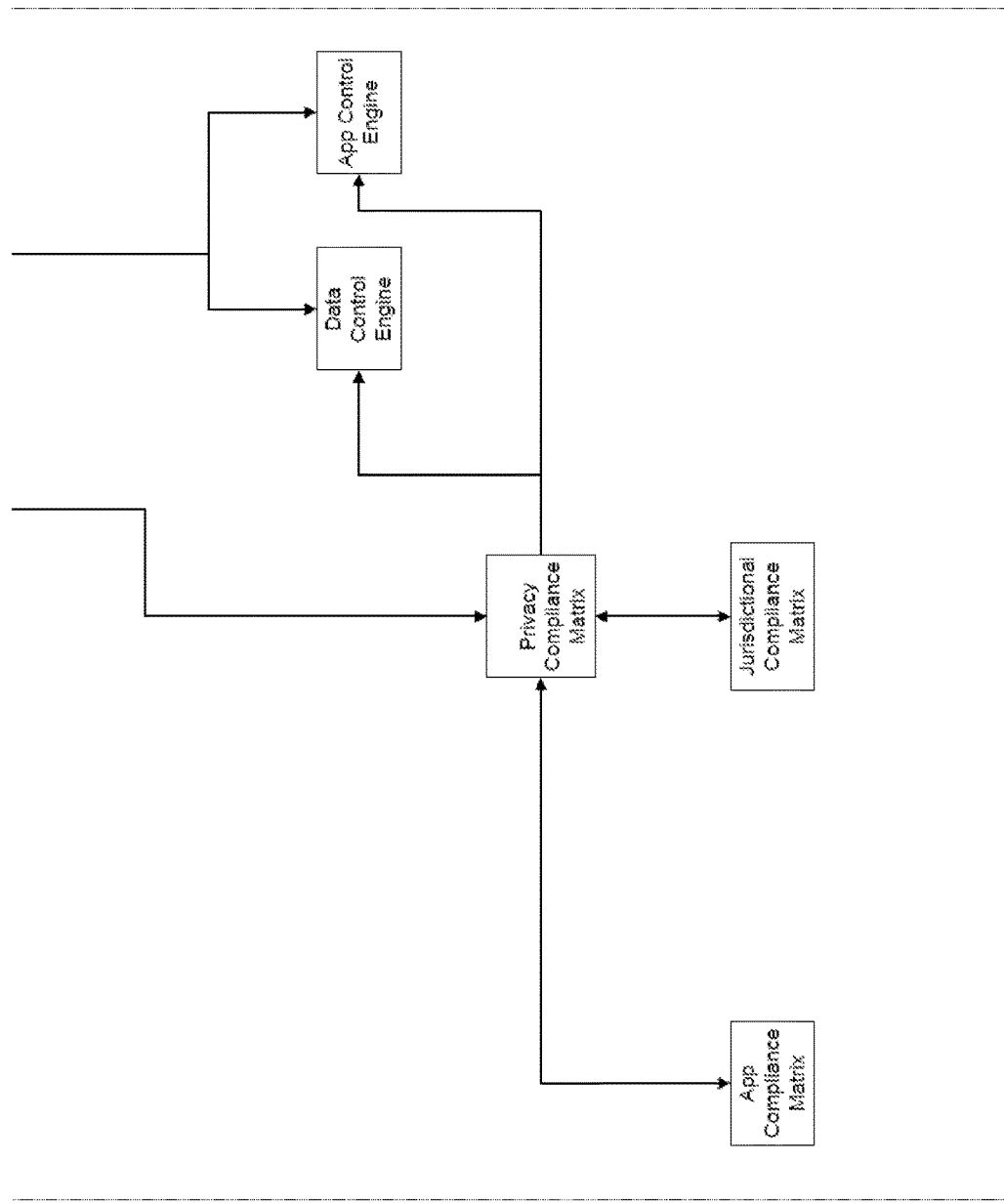
Figure 5D:
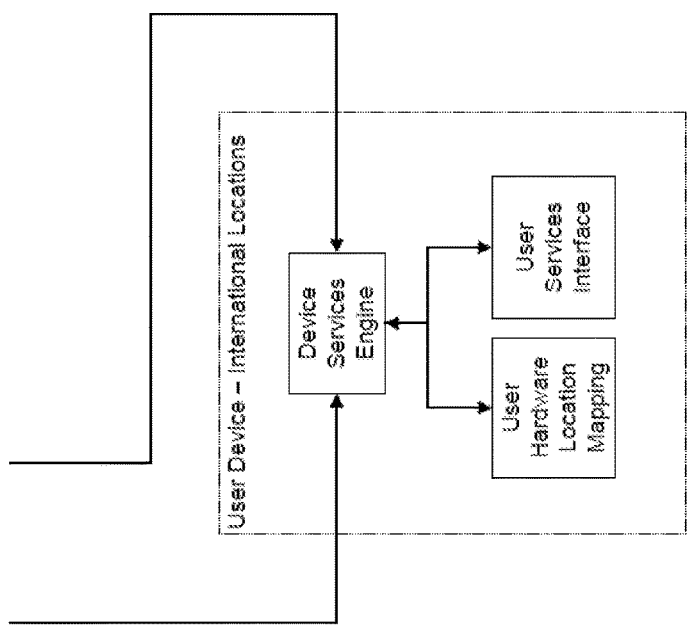

Now referring to FIG. 3, shown is a schematic block diagram of a platform privacy server in accordance with an illustrative embodiment. As shown in this illustrative example, administrative controls provided to a corporate administrator enables management of the entire corporate IT functionality via the privacy server. The privacy server electronically communicates with a user control engine, which manages a user corporate account. The user corporate account links to a user services interface which communicates with a payment portal. The user services interface also connects to a system functions block.

As an illustrative example, FIGS. 4A to 4D and 5A to 5D show schematically how users may locally or remotely access data stored on the platform. Periodically, the SCU will communicate with a user corporate account on the platform privacy server. This communication will contain the current IP address of the SCU. The communication will be encrypted using an encryption technology selected by the user as a wrapper of an enveloped public key encryption technique. Inside the wrapper is the IP address of the SCU which is copied for each user designated in the system, and each copy is encrypted by the individual user's private key. These encrypted IP addresses are stored in the corporate account, and refreshed regularly.

In an alternative embodiment, internet access may be avoided by first performing an encrypted call on a local network inside a company firewall. In this case, if the SCU hears the encrypted call, and the user is active and valid on the local network, then the SCU will return an encrypted internal IP address of a data storage device inside the company's local network. This allows secure communication within the company's internal network without having to access the internet. If the user is not valid on the local network, then the device services engine will contact the platform privacy server for an outside IP address as described above.

In the course of determining whether remote access should be permitted, a jurisdictional compliance matrix may be accessed. Depending on various factors, such as the level of user authentication, the nature of the data for which access is sought, and the location from which the user is seeking remote access may all be used to determine whether the platform privacy server allows the requested data access to proceed.

In an embodiment, the user's device (e.g. laptop, desktop PC, tablet, mobile device) contains a client data engine which regularly checks the connection to the SCU. If the connection is not available, the data service engine will contact the platform privacy server and the corporate account to request a new IP address. A user specific encrypted IP address is accessed from the platform privacy server and sent to the user. The data service engine will then decrypt the IP address and reconnect with the SCU.

Once the data service engine is connected, the network drive definition will verify that all of the appropriate drives have been allocated, that all of the files in the drives are synchronized back to the SCU, and that the SCU has been updated with new revisions as required. All communications will continue to be encrypted in the user specific key. All data is received by the SCU in the user specific key, decrypted, and the file storage component or other data will be re-encrypted using the corporate key of the SCU for storage. When the device services engine confirms that there are sync updates on the SCU for the user, the SCU will decrypt the data file, re-encrypt into the user key, and transmit to the user upon request.

In an embodiment, the device services engine manages a temporary encrypted container on the user device. As a user is interacting with files on the SCU, in order to improve system performance, the user interacts, creates, and edits content locally using a protected, encrypted container. The encryption is user specific and aligns to the encryption keys provided by the SCU that is unique to each user. This encrypted container is only active during the client session, and is removed and inaccessible when a session is closed or connection to the SCU has been lost.

If a corporate account has arranged off-premises storage and backup (for example to a condominium storage unit as described earlier), the SCU will access the jurisdictional compliance matrix to identify a jurisdictionally complaint server, and periodically transmit the SCU dataset to the server. In an embodiment, the data is transmitted using a hybrid key from the SCU corporate key, and encapsulated using a platform privacy server key.

By managing encrypted IP addresses utilizing public and private keys, by utilizing a jurisdictional compliance matrix to authorize any requested connections, and by providing each user with a unique access profile utilizing a private key specific to the user, the platform privacy server effectively manages remote data connections such that jurisdictionally compliant storage and transmission of data between users and the SCU is maintained at all times.

Still referring to FIGS. 4A to 4D and 5A to 5D, in an embodiment, the system functions block allows an administrator to control and manage a number of IT functions, including active/purchased applications, network topology definitions, user administration interface, application services, encryption services, add-on options services, and service quality monitor.

In an embodiment, the user administrative interface controls network associations, which also receives input from the network topology definition block. Network associations is also used to define department/group associations, which receives input from the active/purchased applications block. The department/group associations block populates a user matrix block.

In an embodiment, the user administrative interface is adapted to enable creation of a virtual organization structure, from which a corresponding directory structure may be created. This directory structure is created on a modular data storage device which is physically within an organization's control. Based on the positions and departmental functions defined in the virtual organization structure, access rights to the directories are assigned to the positions and departmental functions. Once established, access to the assigned directories are automatically managed to enforce and maintain data privacy and data security. The directory structure and any offsite storage and backup remains jurisdictionally compliant at all times.

In another embodiment, all data stored within the directory structure on the modular data storage device or any offsite storage device is encrypted, such that only those users in positions with assigned access rights are able to access the data stored in the directory structures. Even data stored within the same directory may be accessed and opened only by users in positions having access rights. Any unauthorized attempts to access, copy or move data are detected and logged, and may be automatically blocked to secure data privacy and data security.

Thus, in summary, the administrative control enables management of the entire corporate IT functionality, including network definitions, directory structures, User/group/department data share associations, application purchase/allocation, encryption services access, and system quality metrics to measure/view system efficiency and monitor corporate scalability requirements. Advantageously, the administrative user does not require any technical domain knowledge, as all details are provided via a high level graphical interface providing effectively go-no go visuals with the ability to set targets/goals based on internal corporate planning.

Autonomous Privacy

Now referring to FIGS. 5A to 5D and 7A to 7D, shown is a schematic block diagram of a user administrative control, data control, and autonomous privacy model in accordance with an illustrative embodiment. As shown, a privacy infrastructure server may include one or more mirror server sites for operational redundancy or data throughput efficiency. In an embodiment, the privacy compliance matrix creates an association between a jurisdictional compliance matrix and an app compliance matrix. The jurisdictional compliance matrix creates an association between user jurisdictional privacy laws, key data transportation limitations, and the individual user's real-time political jurisdiction. The app compliance matrix creates an association between data processing modes, identification of key functions that impact data transportation by nature of operation, and user experience factors that are impacted by processing speed.

In an embodiment, device services engine enables secure access of a User's corporate account and registered system infrastructure individual User accounts via the User Admin module through access to the SCU and through access of the Corporate Account module. The User Admin module manages and captures the critical private information for the client company such as the network drive definition, active purchased applications, department/group associations, user accounts, and user security keys.

Still referring to FIGS. 5A to 5D and also referring to FIG. 3, in an embodiment, the device services engine messages the encrypted user hardware IP location to the corporate account which the privacy matrix generates the appropriate control signals that source the desired application and/or data to/from the user. Each interconnected piece of user hardware will communicate through a currently established SCU IP address and a defined corporate account domain.

IP address is encrypted in transmission into the matrix, and converted into a domain name that identifies the specific user. A similar function occurs within the SCU, described earlier. Thus, the device operations under a hidden IP address. Transmission of IP mapping data is therefore encrypted and secure, and the platform privacy server translates the IP and domain for access.

In an embodiment, an email portal connected to the privacy infrastructure server contains a proprietary email server that handles incoming and outgoing traffic direction to and from the SCU, without storing any user email locally. Data may be synchronized on a User mirror site if this feature is enabled.

Figure 6B:
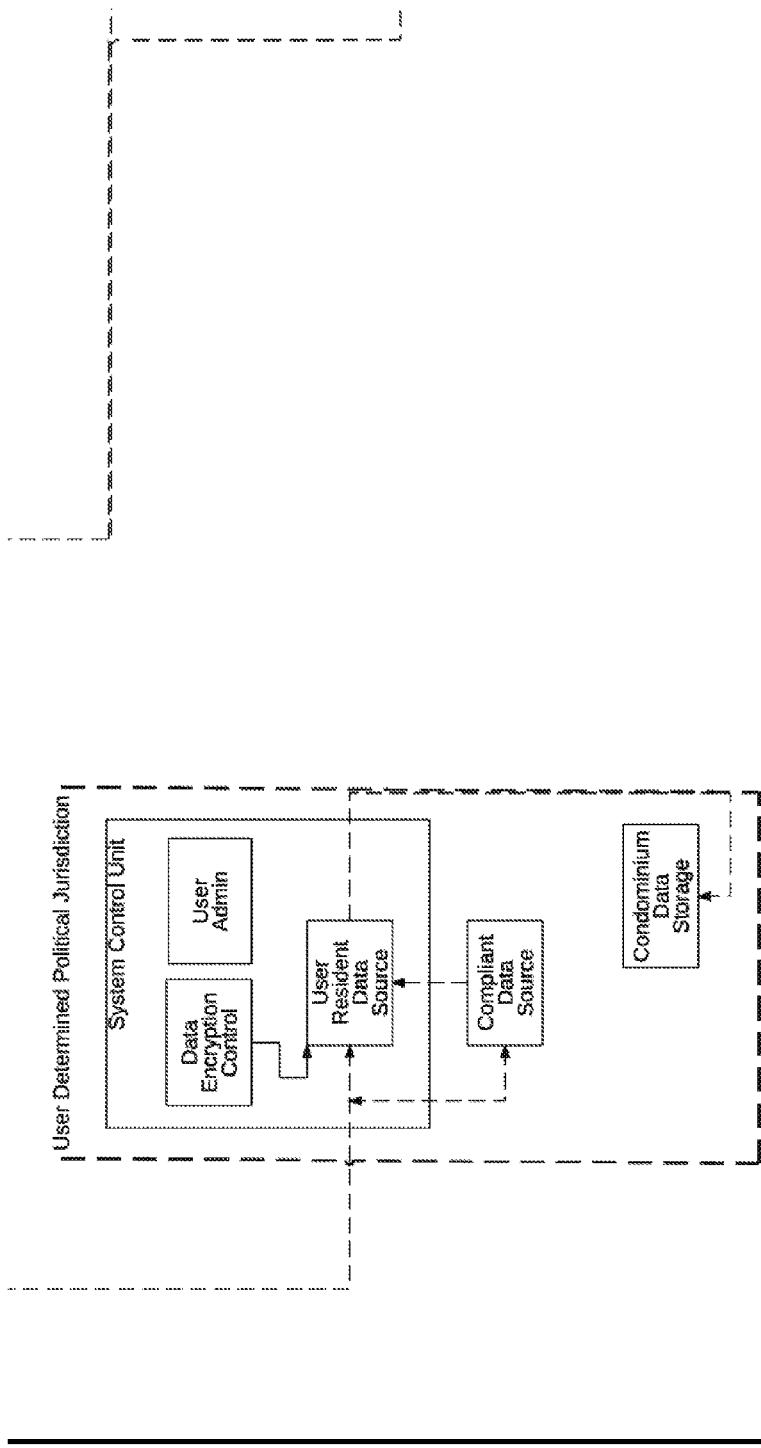
Figure 6C:
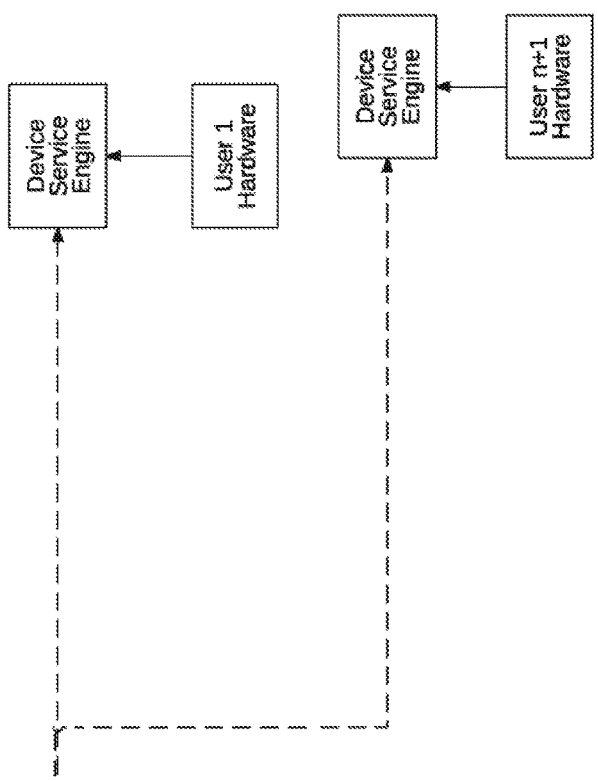
Figure 7A:
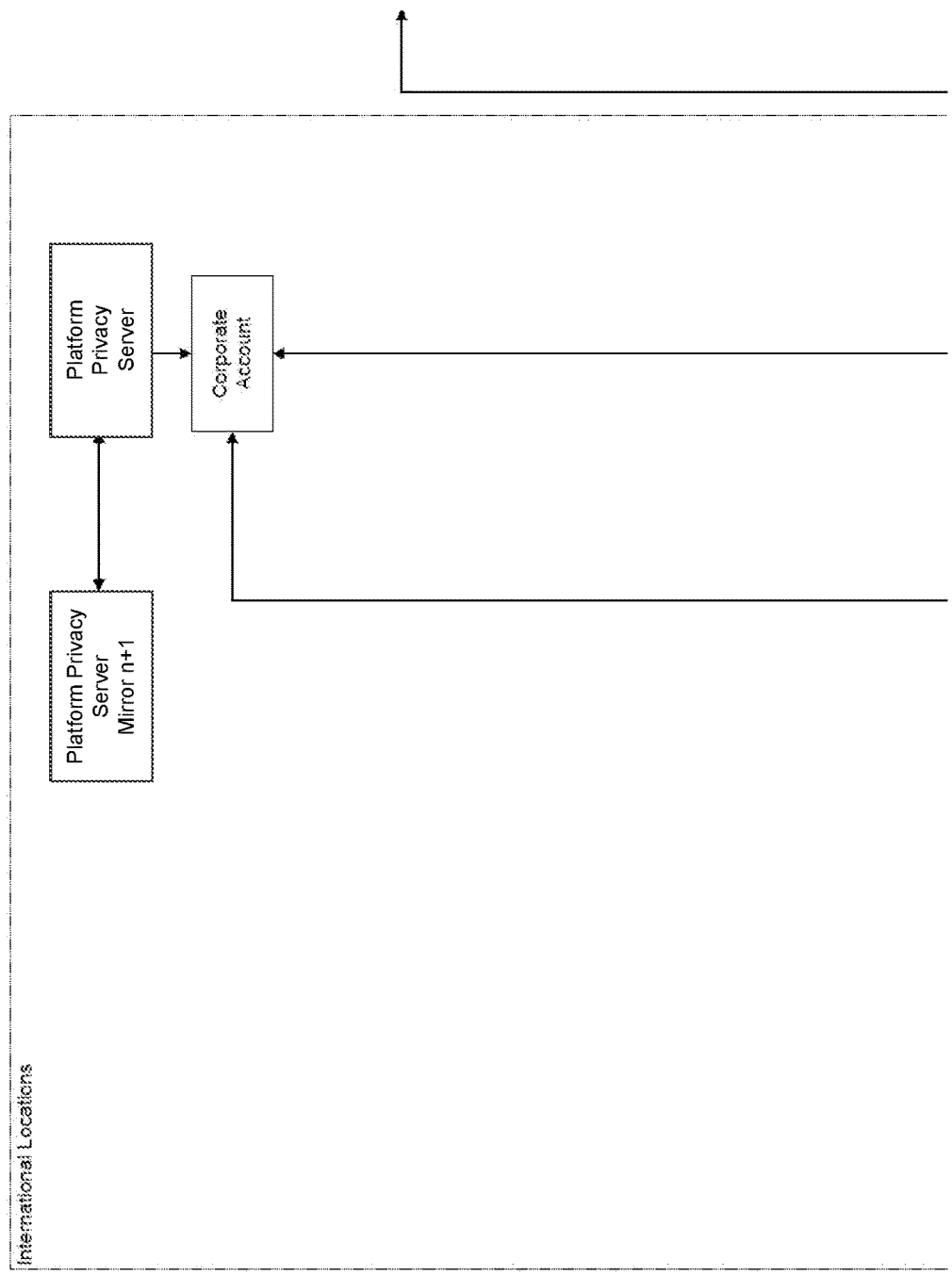
FIGS. 7A to 7D show a schematic block diagram of an illustrative architecture for managing a managing a privacy compliance matrix in accordance with an illustrative embodiment.
Figure 7B:
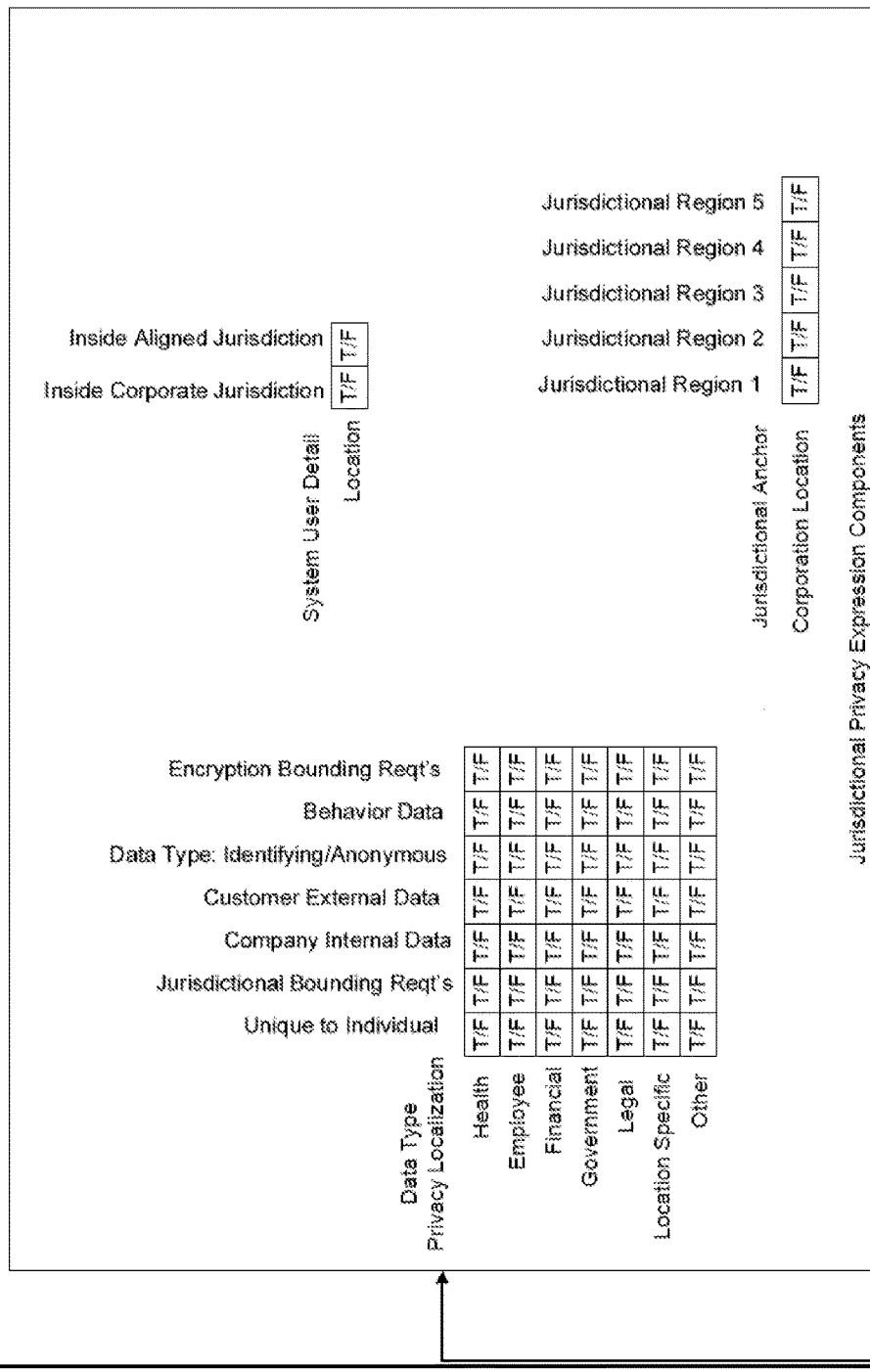
Figure 7C:
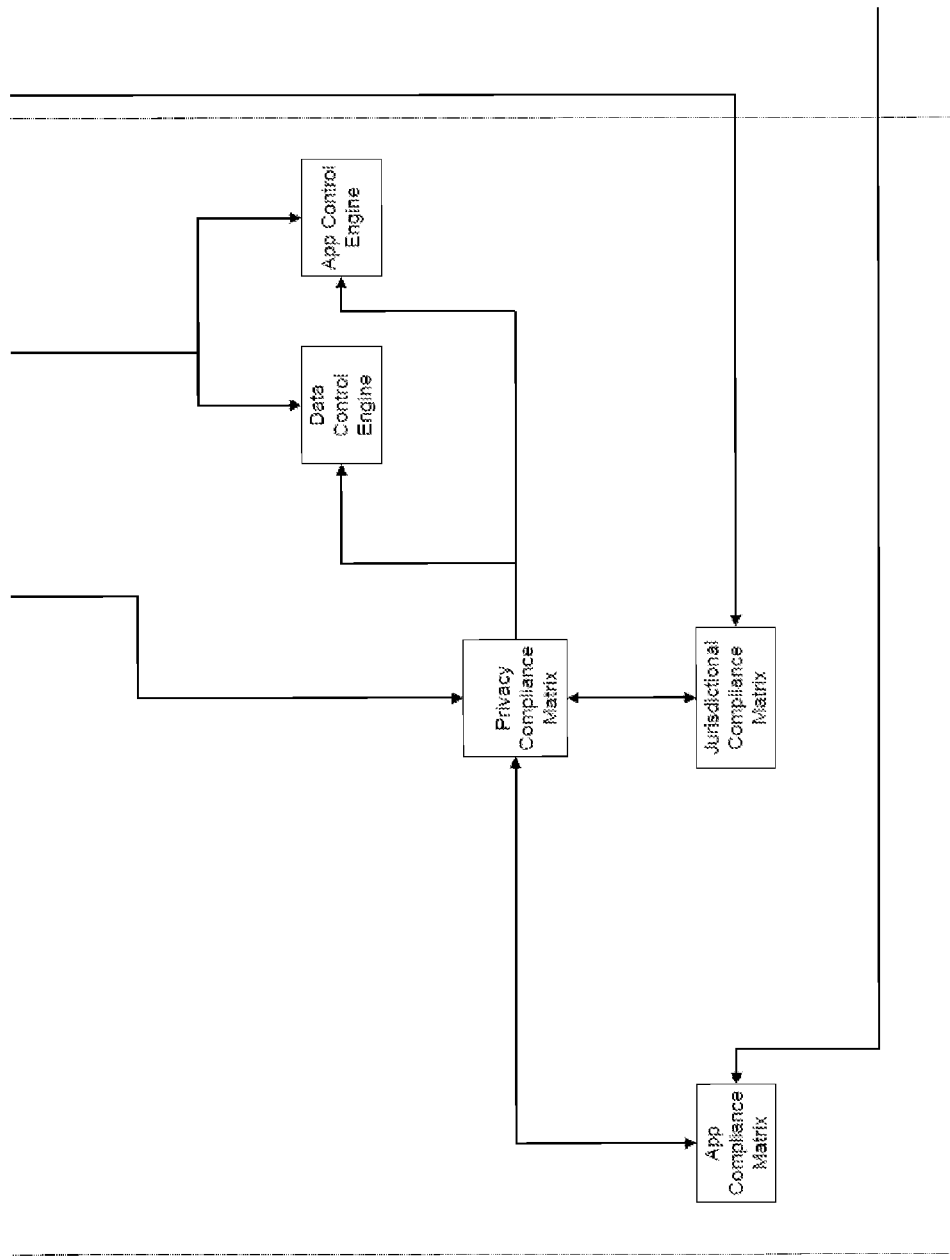
Figure 7D:
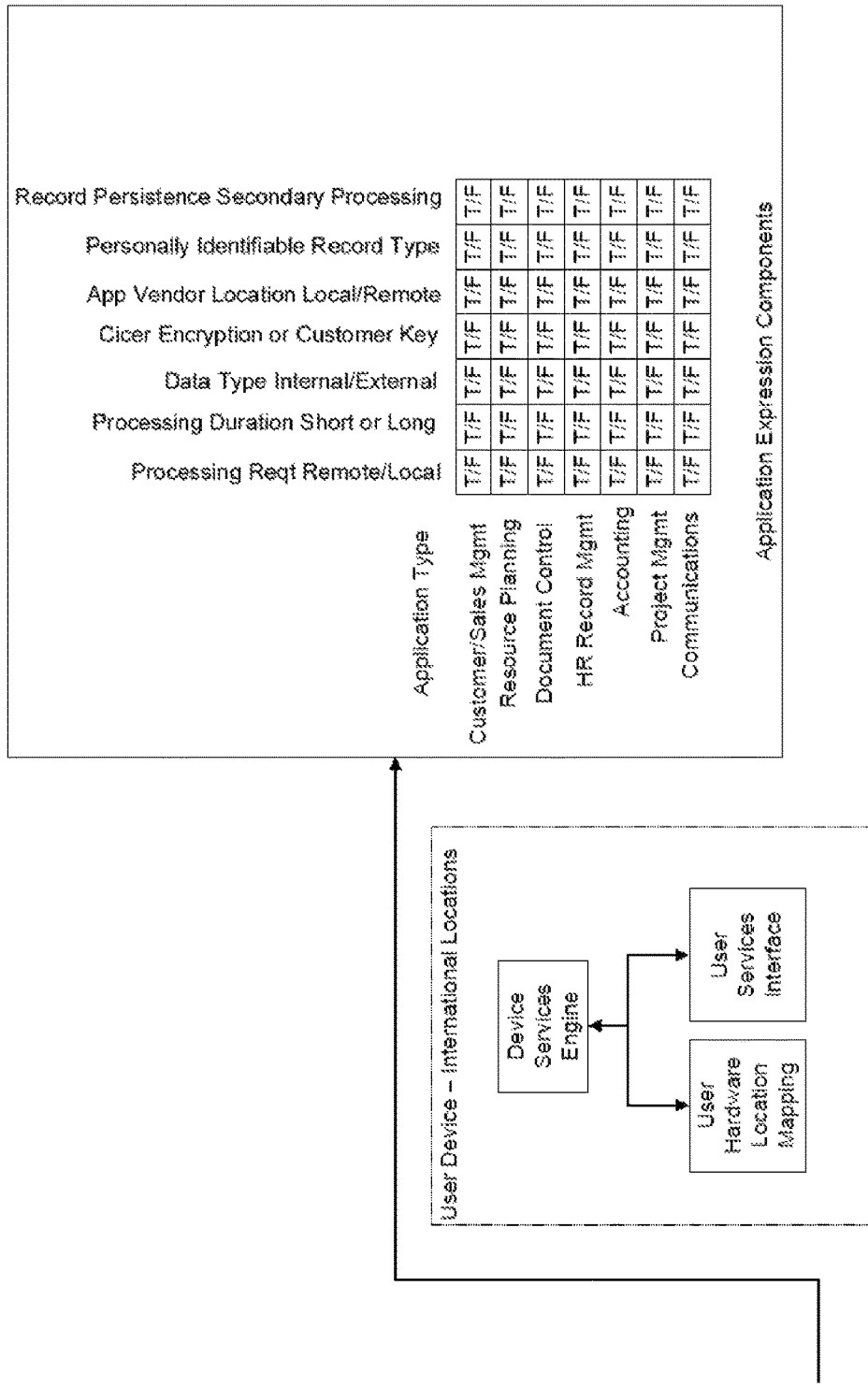

Now referring to FIGS. 6A to 6C and referring back to FIGS. 4A to 4D, shown is a schematic block diagram of a process schematic for user system interaction in accordance with an embodiment. In this schematic diagram, interconnected lines and arrows represent internet communications between systems. Dashed lines indicate user owned and controlled encryption method. Solid lines indicate service provider encryption method. Double dashed lines indicate user owned encrypted software service communications.

As shown, a platform privacy server enables various control tools that manages the system. A device service engine manages local data services such as network topography deployment, local revision control, data synchronization and device specific encryption. This also manages data pathways such that the application can interact with data on the local hardware or virtually through jurisdictionally compliant source.

User resident data is captured by the SCU at the user premises. In an embodiment, an SCU data mirror which is jurisdictionally compliant is offered as an optional service. In certain situations the data mirror may offer faster data access than the SCU.

Upon restart or detection of servicing IP Address change, the SCU will identify the current IP Address providing the active internet connection. The IP Address is then encrypted using each User's unique encryption key. This User connection information is sent encrypted to the user corporate account where it is stored until requested by the User Device Service Engine.

In an embodiment, a setup application creates the corporate network through a visual interaction. The administrator enters information such as the number of employees and managers. The administrator creates a virtual corporate structure, in this case an organizational chart, by a) selecting from one of the preformatted templates that best align to their current structure or b) starting from a blank canvass to visually create a customized organizational chart design. The administrator then creates the directory structure required by the corporation using any desired nomenclature format.

The directory structure is then automatically created from the nomenclature used in the organizational structure desired by the company. The nomenclature may be used to generate the actual directory names so they make sense to all the users in all the departments. This structure is dynamic, and may change as the administrator adds, deletes, or moves personnel or positions within the organizational structure. Once this organization structure is created by the administrator, the scope of data access and the rights of the users within the organizational structure are automatically determined by the platform.

While an organizational chart is provided as an illustrative example, it will be appreciated that other types of virtual corporate structures, whether based on organizational hierarchy or business processes, may also be created. A directory structure which then supports the virtual corporate structure may then be generated by the platform.

In an embodiment, where automatically assigned access rights are not appropriate, the administrator can manually assign and adjust access rights on a case-by-case basis as may be appropriate. This manual assignment of access rights may also be applied to project folder structures created ad hoc in order to set up temporary or longer term working areas where an existing folder structure does not provide sufficient access across corporate departments or functions.

The application visually guides the administrator through the process to create the network directory structure. The administrator is visually guided through the finally process of connecting the directories to the position on the organizational chart and enabling access rights for each user. The administrator assigned ownership to each manager or group leader to adjust the directory rights and access of direct reports.

Now referring to FIGS. 7A to 7D, shown is a schematic block diagram of an illustrative architecture for managing a managing a privacy compliance matrix in accordance with an illustrative example.

In an embodiment, a privacy compliance matrix is created which contains associations between the app compliance matrix and jurisdictional compliance matrix. The output of this association controls the behavior of the data control engine and the app control engine. The user location data does not reveal their actual geographical location rather this is a proprietary code that is used by the app compliance matrix and jurisdictional compliance matrix to present an expression at the input of the privacy matrix. The input expressions result in an output expression that switches the communication channels for the data control engine and the app control engine thereby automatically connecting the user via the device services engine to the compliant service channels. The result ensures privacy compliance for the user without any user intervention.

In another embodiment, an app compliance matrix creates an association between data processing modes, identification of key functions that impact privacy by nature of operation, and user experience factors that are impacted by processing speed.

In another embodiment, a device services engine manages the users current geographic location via the location mapping module. This function of the device services engine relays a proprietary encoded encrypted value that represents the user's jurisdictional location, to the platform privacy server where the privacy matrix interprets and activates the appropriate pathways between the user, the user data, and the applications. This activation ensures the user is compliant to home jurisdictional privacy requirements. The device services engine also manages the client corporate account, system administrative controls, and access to applications and services.

Figure 8:
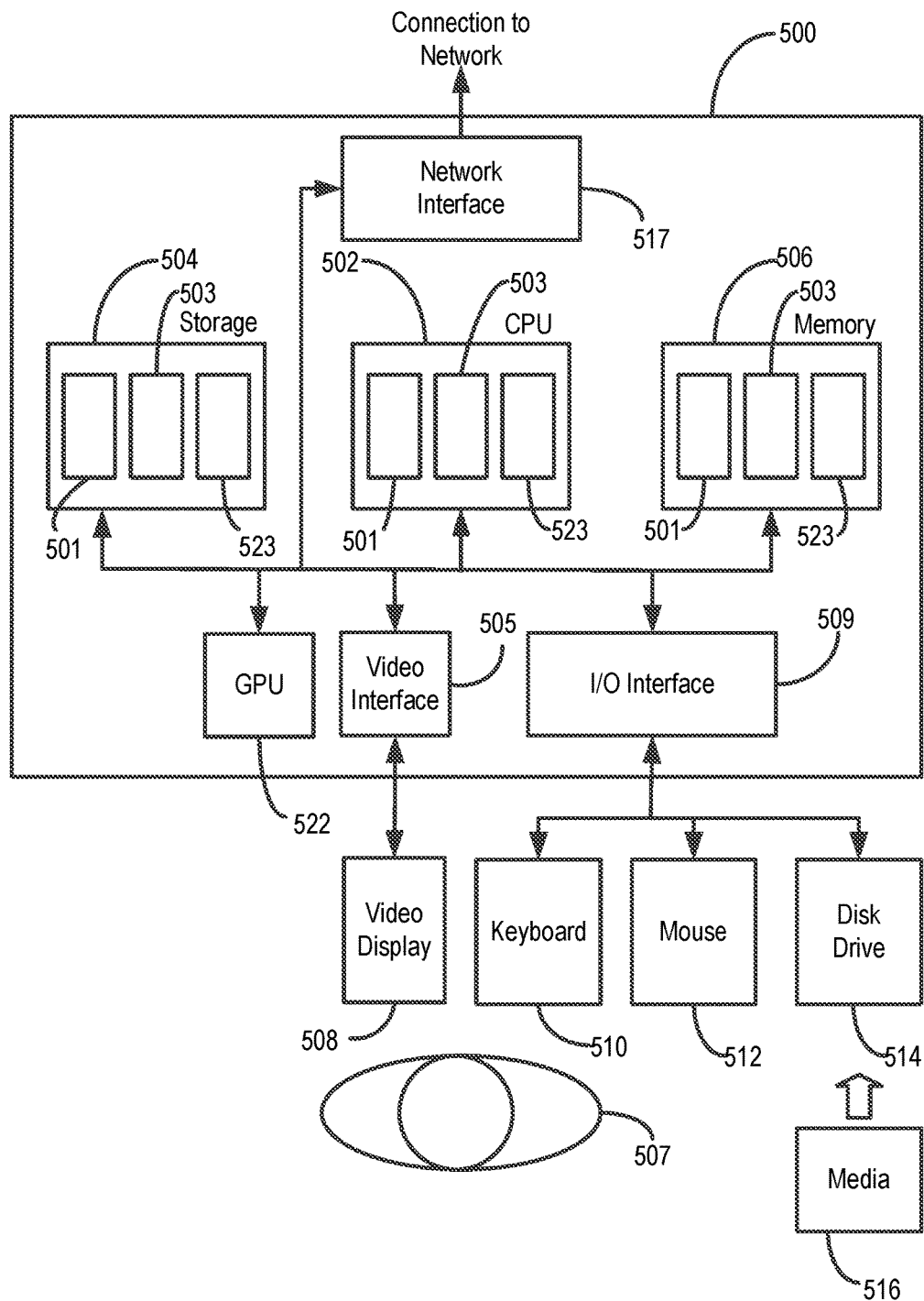
FIG. 8 shows a schematic block diagram of a generic computing device.

Now referring to FIG. 8, the present system and method may be practiced in various embodiments. A suitably configured generic computer device, and associated communications networks, devices, software and firmware may provide a platform for enabling one or more embodiments as described above. By way of example, FIG. 8 shows a generic computer device 500 that may include a central processing unit ("CPU") 502 connected to a storage unit 504 and to a random access memory 506. The CPU 502 may process an operating system 501, application program 503, and data 523. The operating system 501, application program 503, and data 523 may be stored in storage unit 504 and loaded into memory 506, as may be required. Computer device 500 may further include a graphics processing unit (GPU) 522 which is operatively connected to CPU 502 and to memory 506 to offload intensive image processing calculations from CPU 502 and run these calculations in parallel with CPU 502. An operator 507 may interact with the computer device 500 using a video display 508 connected by a video interface 505, and various input/output devices such as a keyboard 510, mouse 512, and disk drive or solid state drive 514 connected by an I/O interface 509. In known manner, the mouse 512 may be configured to control movement of a cursor in the video display 508, and to operate various graphical user interface (GUI) controls appearing in the video display 508 with a mouse button. The disk drive or solid state drive 514 may be configured to accept computer readable media 516. The computer device 500 may form part of a network via a network interface 511, allowing the computer device 500 to communicate through wired or wireless communications with other suitably configured data processing systems (not shown). A sensing device or module, such as a digital camera, may comprise an image processor unit 530 operatively connected to optical device driver 532, and an optical sensing device 534 (e.g. a CCD or CMOS sensor) receiving light through an optical lens 536.

The generic computer device 500 may be embodied in various form factors including desktop and laptop computers, and wireless mobile computer devices such as tablets, smart phones and super phones operating on various operating systems. It will be appreciated that the present description does not limit the size or form factor of the computing device on which the present system and method may be embodied.

Thus, in an aspect, there is provided a data storage and access platform, comprising: one or more data storage units storing user data, the data storage units within a user controlled physical location within a user determined jurisdiction; a system control unit adapted to control access to the one or more data storage units; and a platform privacy server operatively connectable to the system control unit via an encrypted address, the platform privacy server executing a privacy matrix configured to define authorized access and compliant pathways to user data stored on the one or more data storage units; wherein the platform privacy server allows encrypted access to the user data by providing direct user access to the system control unit via the encrypted address only upon confirmation that the user data remains jurisdictionally compliant.

In an embodiment, the data storage and access platform further comprises a user administrative interface for creation of a virtual organization structure from which a corresponding directory structure is generated on the one or more data storage units.

In an embodiment, the data storage and access platform is further adapted to authorize access to the user data in the directory structure on the one or more data storage units based on corporate departments or functions defined in the virtual organization structure.

In an embodiment, any user data stored within the directory structure on the one or more data storage units is encrypted, such that only those users in positions with authorized access are able to access the user data stored in the directory structures over compliant pathways.

In an embodiment, the data storage and access platform is further adapted to detect unauthorized attempts to access, copy or move user data, and to automatically block access attempted over non-compliant pathways.

In an embodiment, the data storage and access platform is further adapted to determine the type of user data to which access is attempted, and to selectively block access dependent upon the type of user data if the user data would not remain jurisdictionally compliant.

In an embodiment, the data storage and access platform further comprises includes an application compliance matrix, and a jurisdiction compliance matrix.

In an embodiment, the jurisdictional compliance matrix contains distilled control signals that map compliance requirements of user defined jurisdictional laws and any system user's real-time location jurisdictional laws.

In an embodiment, the application compliance matrix contains distilled control signals that map a particular application's data manipulation requirements in regards to how it must interact with user data with regard to storage, processing, reporting, and also considering the privacy sensitivity of the data types.

In an embodiment, the privacy matrix maps the two input matrices to produce summation signals that define how a requested application must resolve execution to remain compliant against the jurisdictional privacy laws.

In an embodiment, the data storage and access platform further comprises an offsite data storage device controlled by the user that is jurisdictionally compliant with the jurisdiction in which the one or more data storage units are located, and wherein the platform privacy server is adapted to provide a secure link between the system control unit and a user access controlled storage device located at the offsite data storage location such that encrypted user data may be backed up to the offsite location for redundancy.

In an embodiment, the encrypted user data stored in the offsite data storage location is encrypted by user controlled encryption technology.

In an embodiment, the offsite data storage device is owned by the user, and physically located in a data storage condominium in a user determined political jurisdiction.

In an embodiment, offsite data storage device is accessible to the user, and removable by the user from the data storage condominium.

In an embodiment, the data storage and access platform is adapted to receive a plug-in encryption device for encrypting all user data on the one or more data storage units.

In an embodiment, the plug-in encryption device comprises a standalone microprocessor enabled device adapted to generate high-grade security encryption keys for the platform.

In an embodiment, the encryption keys generated by the plug-in encryption device for the platform are required to access the platform via any local or remote network.

In an embodiment, the encryption keys generated by the plug-in encryption key is used to encrypt user data stored on an offsite data storage device.

In an embodiment, the platform privacy server executing the privacy matrix is further configured to define authorized access pathways for the execution of a user-called SaaS application only upon confirmation that the requested access pathway handling of user data is jurisdictionally compliant.

In an embodiment, the privacy matrix is adapted to process the jurisdiction and local privacy laws in which the one or more data storage units are located, the jurisdiction from which a remote user is seeking access, and the nature of the user data being requested by a SaaS application.

In an embodiment, the platform privacy server is adapted to permit access to software as a service (Saas) application providers who are in compliance with user data policies, including manipulation and storage of any user data in accordance with jurisdictional privacy laws via the privacy matrix.

While illustrative embodiments of the invention have been described above, it will be appreciate that various changes and modifications may be made without departing from the scope of the present invention.

The invention claimed is:

1. A data storage and access platform, comprising:
one or more data storage units storing user data, the data storage units within a user controlled physical location in a user determined jurisdiction;
a system control unit adapted to control access to the one or more data storage units;
a platform privacy server operatively connectable to the system control unit via an encrypted address, the platform privacy server executing a privacy matrix configured to define authorized access and compliant pathways to user data stored on the one or more data storage units; and
an application compliance matrix, and a jurisdiction compliance matrix;
wherein the platform privacy server allows encrypted access to the user data by providing direct user access to the system control unit via the encrypted address only upon confirmation that the user data remains jurisdictionally compliant; and
wherein the jurisdictional compliance matrix contains distilled control signals that map compliance requirements of user defined jurisdictional laws and any system user's real-time location jurisdictional laws.

2. The data storage and access platform of claim 1, wherein the application compliance matrix contains distilled control signals that map a particular application's data manipulation requirements in regards to how it must interact with user data with regard to storage, processing, reporting, and also considering the privacy sensitivity of the data types.

3. The data storage and access platform of claim 2, wherein the privacy matrix maps the two input matrices to produce summation signals that define how a requested application must resolve execution to remain compliant against the jurisdictional privacy laws.

4. A data storage and access platform, comprising:
one or more data storage units storing user data, the data storage units within a user controlled physical location in a user determined jurisdiction;
a system control unit adapted to control access to the one or more data storage units;
a platform privacy server operatively connectable to the system control unit via an encrypted address, the platform privacy server executing a privacy matrix configured to define authorized access and compliant pathways to user data stored on the one or more data storage units;
wherein the platform privacy server allows encrypted access to the user data by providing direct user access to the system control unit via the encrypted address only upon confirmation that the user data remains jurisdictionally compliant; and
further comprising an offsite data storage device controlled by the user that is jurisdictionally compliant with the jurisdiction in which the one or more data storage units are located, and wherein the platform privacy server is adapted to provide a secure link between the system control unit and a user access controlled storage device located at the offsite data storage location such that encrypted user data may be stored to the offsite location for redundancy.

5. The data storage and access platform of claim 4, wherein the encrypted user data stored in the offsite data storage location is encrypted by user controlled encryption technology.

6. The data storage and access platform of claim 4, wherein the offsite data storage device is owned by the user, and physically located in a data storage condominium in a user determined political jurisdiction.

7. The data storage and access platform of claim 6, wherein the offsite data storage device is accessible to the user, and removable by the user from the data storage condominium.

* * * * *